United States Patent
Kaga et al.

[11] Patent Number: 5,886,766
[45] Date of Patent: Mar. 23, 1999

[54] PROGRESSIVE MULTIFOCAL LENS AND MANUFACTURING METHOD THEREFOR

[75] Inventors: Tadashi Kaga; Kazutoshi Kato, both of Suwa, Japan

[73] Assignee: Seiko Epson Corporation, Tokyo, Japan

[21] Appl. No.: 656,291

[22] Filed: Jun. 6, 1996

[30] Foreign Application Priority Data

Oct. 6, 1994 [JP] Japan .................................. 6-243112

[51] Int. Cl.⁶ ........................................................ G02C 7/06
[52] U.S. Cl. .......................................... 351/169; 351/177
[58] Field of Search .................................. 351/168, 169, 351/170, 171, 172, 177

[56] References Cited

U.S. PATENT DOCUMENTS

| | | | |
|---|---|---|---|
| 4,514,061 | 4/1985 | Winthrop | 351/169 |
| 4,838,675 | 6/1989 | Barkan et al. | 351/169 |
| 4,861,153 | 8/1989 | Winthrop | 351/169 |

FOREIGN PATENT DOCUMENTS

| | | |
|---|---|---|
| 57-94714 | 6/1982 | Japan . |
| 59-48732 | 3/1984 | Japan . |
| 60-61719 | 4/1985 | Japan . |
| 61-252526 | 11/1986 | Japan . |
| A-64-63923 | 3/1989 | Japan . |
| 2-248920 | 10/1990 | Japan . |

*Primary Examiner*—Scott J. Sugarman
*Attorney, Agent, or Firm*—Oliff & Berridge, PLC

[57] ABSTRACT

In a process of determining the surface shape of each of progressive multifocal lenses for use as lenses in eyeglasses, radii of curvature at main points are calculated, and then the surface is divided into a plurality of lattice sections, and then a curved-surface equation in the form of a bicubic expression is used for each section to determine the surface shape of the lens. A coefficient of each of the bicubic expressions is determined under a condition that continuation is established to curved-surface equations of sections adjacent at a boundary line between the sections to the derivatives of second order. Therefore, the surface shape of the lens obtained by the curved-surface equation for each section can be formed into a continuous and smooth surface. Since the curved surface can be determined for each section, a partial correction can easily be performed, if necessary. As a result, a progressive multifocal lens can be provided which exhibits smooth astigmatism curves and a large clear field of vision to meet a variety of specifications. Thus, lenses for eyeglasses each having a clear field of vision can be provided.

18 Claims, 20 Drawing Sheets

PROGRESSIVE MULTIFOCAL LENS AND MANUFACTURING METHOD THEREFOR

TECHNICAL FIELD

The present invention relates to a progressive multifocal lens for use in eyeglasses and to a method of manufacturing the same.

BACKGROUND ART

A progressive multifocal lens is a lens consisting of two portions having different refractive powers from each other, and another portion formed between the two portions and having refractive powers which is progressively changed. The progressive multifocal lens has no boundary, exhibits excellent appearance and enables fields of vision having different refractive powers to be obtained from one lens. Therefore, the progressive multifocal lenses have been used widely for lenses for eyeglasses for correcting presbyopia. FIG. 1 shows the general structure of a progressive multifocal lens which has been used widely as a lens for eyeglasses. FIG. 1 is a perspective view of an outer surface (the surface) 2 of a lens 1 for eyeglasses which projects outwards to form convexity. The lens 1 has an inner surface facing a wearer's eye and having a substantially constant curvature, and the outer surface 2 having different curvatures so as to form two portions having different refractive powers from each other and an intermediate portion connecting the foregoing two portions to each other.

When a portion extending along main meridian curve M located substantially in the central portion of the surface 2 of the lens is examined, the main meridian curve M1 above distance design reference point A has a substantially constant radius of curvature R1. Main meridian curve M2 below near design reference point B located below the distance design reference point A has a substantially constant radius of curvature R2 which is smaller than the radius of curvature of the main meridian curve M1 located above the main meridian curve M2. Main meridian curve M3 extending from the distance design reference point A to the near design reference point B has a radius of curvature which is gradually changed from R1 to R2. A portion above the distance design reference point A is a distance portion 5 having a relatively small refractive power. On the other hand, a portion below the near design reference point B is a near portion 6 which is a portion having relatively large refractive power. Assuming that the refractive power; index of the lens 1 is n, the base curve of the surface 2 of the lens is expressed by $((n-1)/R1)$. A major portion of the curved surfaces forming the distance portion 5 is defined by the foregoing curve. The foregoing base curve is hereinafter expressed with the refractive power (diopter (D) units) of the curved surface defined with the base curve.

A portion from the distance portion 5 to the near portion 6 is an intermediate portion 7. In this portion, the refractive power is progressively changed. The change in the plane refractive power taking place from the distance design reference point A to the near design reference point B is called addition power. Also the addition power is hereinafter indicated in diopter (D) units.

A major portion of the progressive multifocal lenses is designed such that the curvature of the main meridian curve M is the same as the curvature in a direction perpendicular to the main meridian curve M of the surface 2. That is, the portion along the main meridian curve M is formed into a substantially spherical shape having the surface, the astigmatism (the surface astigmatism) of which is zero. However, the other portions, forming one smooth surface by continuously connecting the distance portion 5 and the near portion 6 having different refractive powers to each other, are formed into aspheric surfaces. Thus, astigmatism is generated. In general, an aspheric surface is easily formed as the distance from the main meridian curve M is lengthened, thus causing the surface astigmatism to be enlarged in the periphery of the lens. Then, the surface astigmatism is obtained from the difference in the curvature at various points of the surface 2 of the lens, the obtained surface astigmatism being expressed as values converted into diopter units. A usual wearer of eyeglasses is able to obtain a clear sight if the astigmatism is 1.0 diopter or less, preferably 0.5 diopter or less, in such a manner that the wearer does not suffer from lack of focus. Therefore, the portion in which the astigmatism is included in the foregoing value range is called a "clear sight portion". The wider the foregoing clear sight portion is, the clearer images can be.

The progressive multifocal lens has astigmatism because of the structure thereof. Therefore, it is an important consideration in designing the lens to determine the permissible positions and degrees of astigmatism produced by the lens. If one point is observed closely (where static sight is required) for example reading a book, it is preferable that the overall astigmatism is small to obtain a clear image. Moreover, it is preferable that a wide clear sight be realized in each of the distance portion, near portion and the intermediate-sight portion. If an object in one's field of vision is moved relatively (where dynamic sight is required) to the field of vision, for example, where a wearer of eyeglasses follows a moving object or the wearer moves his/her neck, it is preferred that the astigmatism produced in the periphery of the lens, of course, be small. Moreover, it is preferable that change in the astigmatism is moderate and the astigmatism is routinely changed in the direction in which the user's eye moves. That is, when positions having the same astigmatism are connected by a curve, the smoother the astigmatism curves are, movement of the image can be prevented and clearer sight can be obtained.

It is very difficult to obtain a progressive multifocal lens exhibiting both excellent static sight and an excellent dynamic sight. That is, to obtain excellent static sight, a wide clear field of vision is required, thus causing the astigmatism to be enlarged in the intermediate portion and the periphery of the lens. As a result, smooth astigmatism curves cannot be obtained. Thus, excellent dynamic sight cannot be easily obtained. If the astigmatism is dispersed to obtain an excellent dynamic sight, clear field of vision is reduced. Thus, the static sight deteriorates. In order to obtain clear sight with the progressive multifocal lens of the foregoing type, a plurality of different design concepts have been disclosed. For example, a progressive multifocal lens has been disclosed in Japanese Patent Laid-Open No. 57-94714 in which the clear field of vision in the near portion is reduced because dynamic sight is not necessarily required when, for example, reading a book; and the clear field of vision in the distance portion, in which dynamic sight is required, is enlarged. In Japanese Patent Laid-Open No. 2-248920, a progressive multifocal lens is disclosed in which the clear field of vision in the near portion is enlarged and the clear field of vision in the distance portion is reduced.

In Japanese Patent Laid-Open No. 59-48732, a structure has been disclosed in which the boundary lines of the intermediate portion perpendicular to the main meridian curve are moved vertically to prevent change in the astigmatism in the side portions of the intermediate portion. In Japanese Patent Laid-Open No. 60-61719, a structure has been disclosed in which the progressive zone is considerably lengthened to prevent change in the refractive power so as to improve the intermediate field of vision and distance field of vision.

In accordance with the various design concepts, the distribution of the refractive power over the surface of the lens and the curvatures corresponding to the refractive powers are determined. Then, a curved-surface equation is obtained which is capable of smoothly connecting the foregoing portions to determine the surface shape of the progressive multifocal lens. A polynomial of degree "n" is usually employed as the curved-surface equation. For example, employment of a polynomial of ten to twenty-four degrees has been disclosed in Japanese Patent Laid-Open No. 61-252526. To express a complicated plane of the progressive multifocal lens, a curved-surface equation ten degrees or higher is required. However, even if the foregoing curved-surface equation of such higher degrees is employed, the surface of the progressive multifocal lens cannot satisfactorily be represented. In a case where smooth astigmatism curves are obtained for example, it is preferable that the surface is represented by a curved-surface equation without higher degree terms, if possible. However, if higher degree terms are not introduced, a surface of a lens in which the refractive power is distributed in accordance with the foregoing design concept cannot easily be obtained. If the addition power is large, a curved-surface equation using higher degree terms is required. If the surface of the lens is expressed by a higher degree curved-surface equation, the astigmatism is increased in the periphery of the lens. Since smooth astigmatism curves cannot be obtained in this case, movement of the image is intensified. Therefore, a curved-surface equation of intermediate degree is inevitably employed. Thus, the intention of the various design concepts cannot satisfactorily be realized. In particular, a curved-surface equation for forming the surface of a lens having satisfactory performance cannot easily be obtained for a progressive multifocal lens having a large addition power, which easily produces the astigmatism. Therefore, an appropriate curved-surface equation cannot easily be obtained if a considerably long period of time is taken.

After the higher degree curved-surface equation has been obtained, the performance of the progressive multifocal lens having the surface shape expressed by the obtained curved-surface equation is confirmed. At this time, correction of a portion of the refractive power distribution is sometimes required to improve the performance of the lens if the obtained performance is unsatisfactory. However, the obtained curved-surface equation is an equation for representing the overall surface of the lens. Therefore, partial change of the refractive power distribution does not result in a partial change of the curved-surface equation but results in change in the overall curved-surface equation. Therefore, a special curved-surface equation must be obtained. Accordingly, more time is required to again obtain a curved-surface equation. The surface shape of the lens obtainable by correcting a portion of the same is innovative, thus resulting in a necessity in which confirmation of the performance and the like of the lens is repeated. Therefore, an appropriate surface shape of the lens cannot easily be obtained and a long period of time is required. Since the curved-surface equation is determined by the foregoing method, an optimum curved-surface equation cannot always be obtained and the astigmatism cannot easily be optimized.

Accordingly, an object of the present invention is to provide a progressive multifocal lens capable of setting an optimum quantity of astigmatism in accordance with the foregoing various design concepts and a manufacturing method therefor. Moreover, an object of the present invention is to provide a progressive multifocal lens capable of easily correcting a portion of the surface shape of the lens and obtaining an optimum surface shape of the lens in a short period of time and a manufacturing method therefor. Another object of the present invention is to provide a progressive multifocal lens exhibiting a large clear field of vision and smooth astigmatism curves and enabling clear static sight and dynamic sight simultaneously and a manufacturing method therefor.

DISCLOSURE OF THE INVENTION

A progressive multifocal lens according to the present invention is arranged in such a manner that its surface is not expressed by one curved-surface equation but rather the surface is divided into a plurality of sections and an optimum curved-surface equation for each section is used to express the surface shape. That is, a progressive multifocal lens according to the present invention comprises a distance portion having relatively low refractive power, a near portion having relatively high refractive power and an intermediate portion having refractive power which is progressively changed between the two portions, wherein at least either surface of the progressive multifocal lens is continuously divided into a plurality of sections each of which has a surface shape determined in accordance with a curved-surface equation therefor. Moreover, the curved-surface equations for the sections are, in each boundary of the sections, continuous to each other at least to the extent of derivative functions of second order of the curved-surface equations. Therefore, a smooth curved surface can be obtained over the surface of the lens.

A progressive multifocal lens according to the present invention can be manufactured by a manufacturing method comprising the steps of: setting distribution of refractive power of the distance portion, the near portion and the intermediate portion for at least one surface of the progressive multifocal lens; setting a curvature radius in accordance with the set distribution of the refractive power; dividing the surface of the lens into a plurality of continuous sections; determining a curved-surface equation for each section under a condition that at least the curved-surface equations for respective sections are continuous in the boundaries of the respective sections at least to the extent of derivative functions of second order of the curved-surface equations; and forming the surface of the lens to have a surface shape determined in accordance with the curved-surface equation for each section.

The progressive multifocal lens according to the present invention has the surface shape determined by using an optimum curved-surface equation for each section. Therefore, the surface shape for a variety of design concepts can easily be realized. Furthermore, the curved-surface equation for one or a plurality of sections can easily be changed so that the surface of the lens is partially corrected. Therefore, the present invention enables an optimum surface shape for a lens to be formed. Thus, a progressive multifocal lens having a large clear field of vision and smooth astigmatism curves can be provided. Moreover, an operation can easily be performed in which the difference in the distribution of the astigmatisms and in the refractive powers at the position of the eye obtained by a ray tracing method are obtained, and then the radius of curvature is corrected to minimize the differences, and then the curved-surface equations are obtained. Therefore, a progressive multifocal lens having excellent performance can be provided. Moreover, a lens having a large addition power can be formed into a progressive multifocal lens having satisfactory performance.

Since the curved-surface equation represents the curved surface in the section, the surface shape of a lens having satisfactory performance can be represented by curved-surface equations in the form of bicubic expressions. As a matter of course, higher curved-surface equations, such as biquartic equations, may be used. However, the higher degree curved-surface equation over ten degrees, which has been required with the conventional structure, is not required. Moreover, a task for obtaining an optimum curved-surface equation can be saved.

The surface of the lens is required to be divided into polygonal sections, the shape of which is not particularly limited. For example, the surface may be divided into lattice shapes. It is convenient in the foregoing case when a computer is used to perform calculations for obtaining coordinates of each section. Astigmatism curves of a progressive multifocal lens realized by obtaining a curved-surface equation in such a manner that the surface is divided into lattice sections, one side of which is about 1 mm to about 4 mm, are smoother as compared with the astigmatism curves of a conventional progressive multifocal lens obtained by a higher polynomial. When the curved-surface equation is obtained by dividing the surface into lattice shapes, one side of which is about 1 mm to about 3 mm, a surface shape of the lens can be obtained which has smooth astigmatisms and a large clear field of vision. When the curved-surface equation is obtained by dividing the surface into lattice sections, one side of which is about 1 mm to about 2 mm, smoother astigmatisms and large clear fields of vision can be obtained. It is also effective to divide the surface of the lens into sections having different areas. For example, the near portion, in which the density of the astigmatism curves can easily be high, may be divided into lattice sections, one side of which is about 1 mm to about 3 mm, to obtain the curved-surface equation. It is also effective to divide the intermediate portion, in which the refractive power is progressively changed, into lattice sections, one side of which is about 1 mm, to obtain the curved-surface equation.

Referring to the drawings, the present invention will now be described further in detail.

BEST MODE FOR CARRYING OUT THE INVENTION

Figure 1:
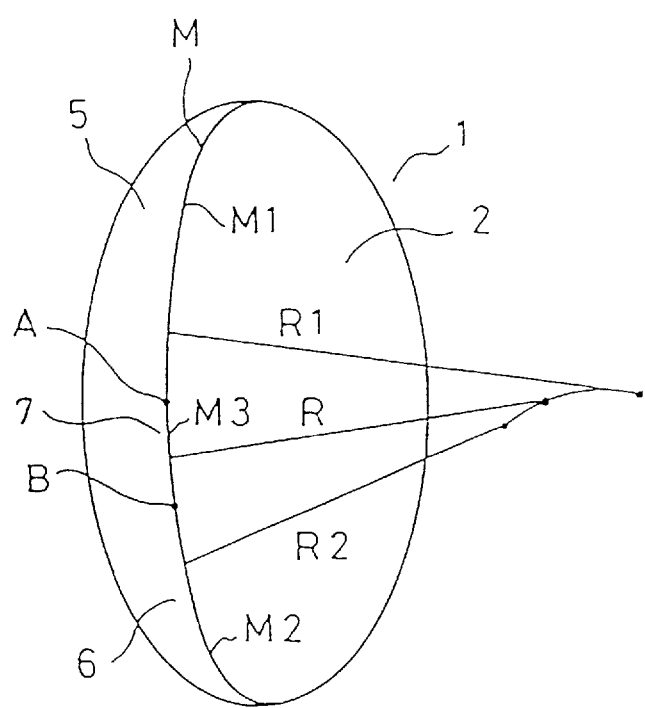
FIG. 1 is a perspective view showing the schematic surface shape of a progressive multifocal lens for use as lenses for eyeglasses.
Figure 2:
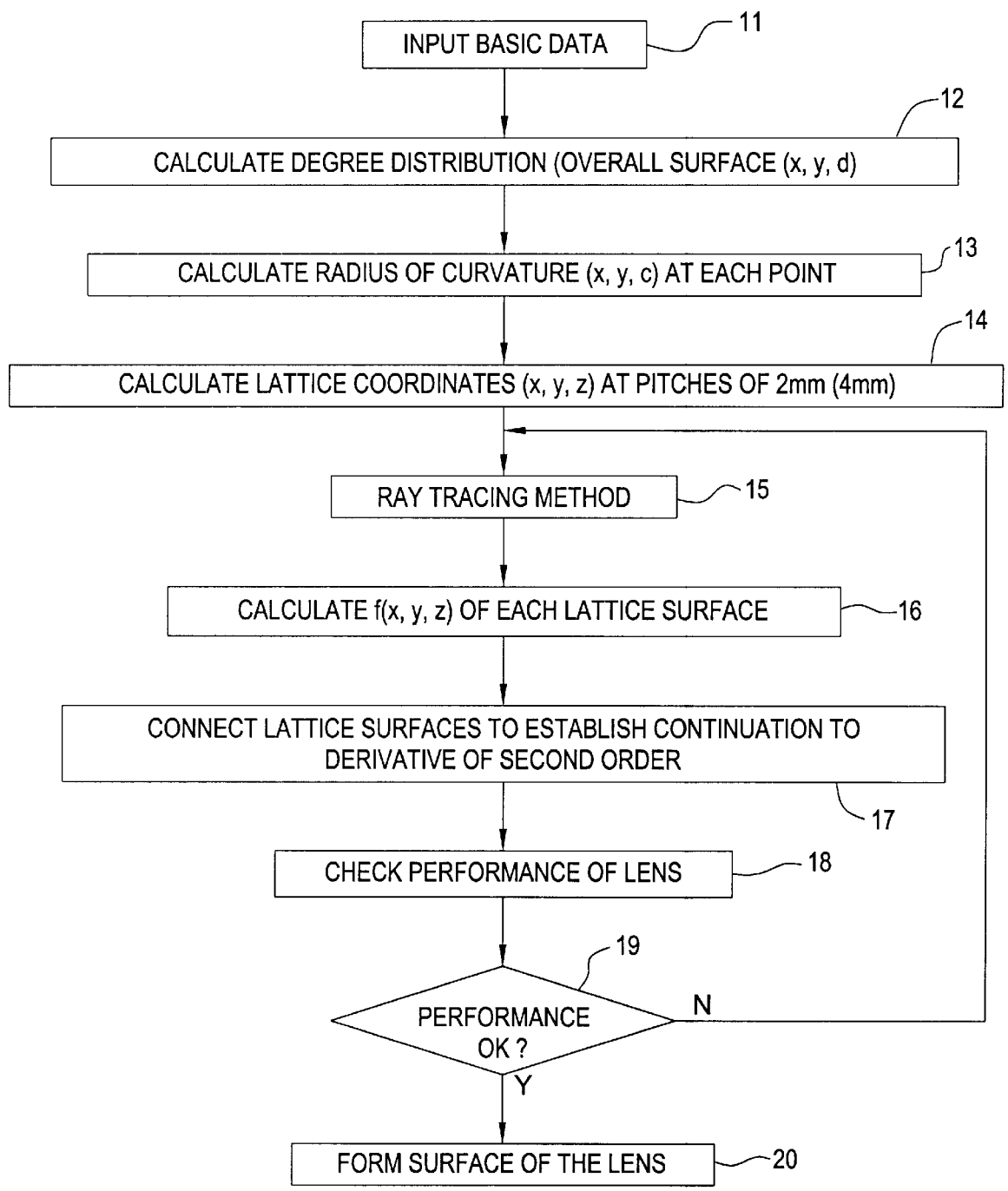
FIG. 2 is a flow chart showing a process for manufacturing the progressive multifocal lens according to an embodiment of the present invention for use as a lens for eyeglasses.

Referring to embodiments of the present invention, the present invention will now be described in detail. FIG. 2 shows a flow chart of a method of manufacturing a progressive multifocal lens for use as a lens for eyeglasses according to the present invention. In step 11, basic specifications of the progressive multifocal lens, for example, the base curve, addition power and the refractive power are supplied to a computer. Note that the description will be performed about a progressive multifocal lens having a surface (hereinafter called a "reverse surface") facing the eye of a wearer and formed to have a substantially constant curvature, and an external surface (the surface) opposite to the eye of the wearer and formed to have different curvatures.

In step 12, the lens degree distribution (the refractive power distribution) of the overall surface of the lens is obtained in accordance with the foregoing design concept. In step 13, the curvature radius at each of main points of the surface of the lens is calculated in accordance with the degree distribution to determine the outline of the distribution of the astigmatisms. In this state, the main surface shape of the surface and the reverse surface of the lens are determined.

Figure 3:
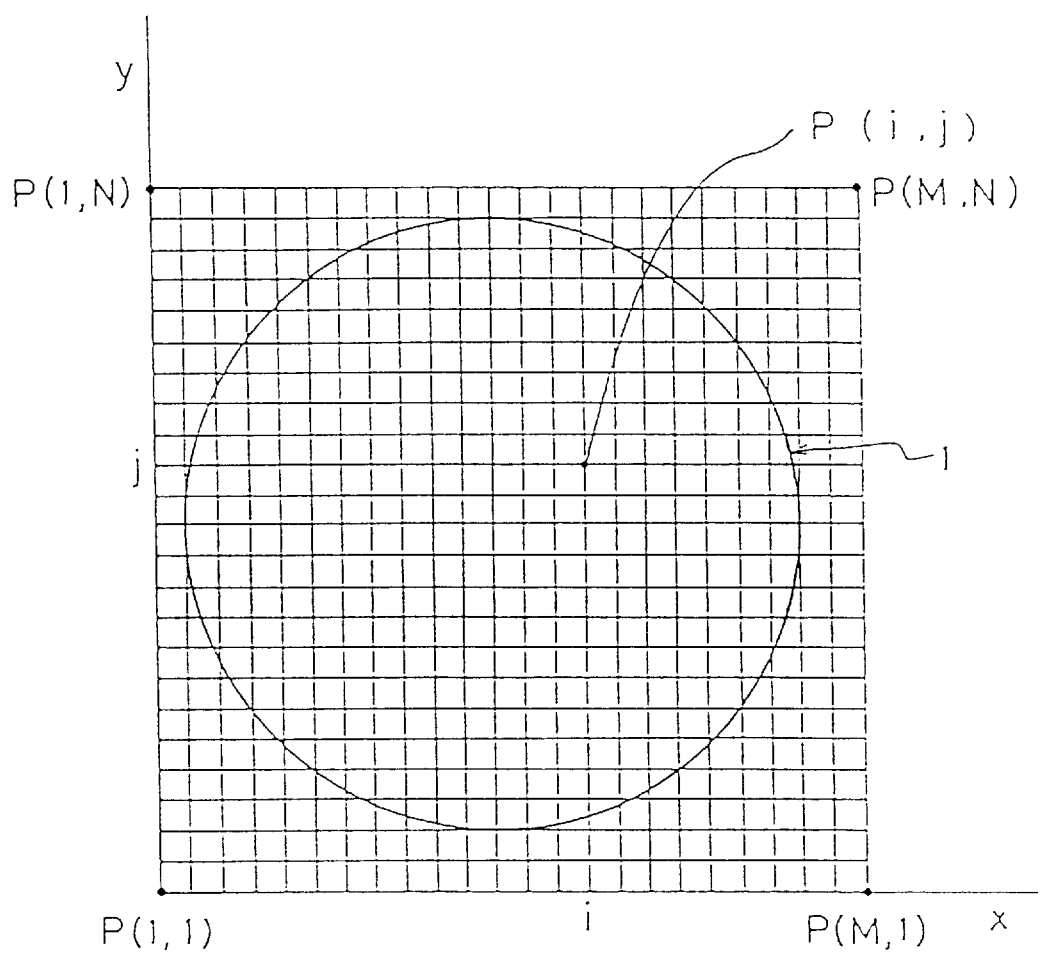
FIG. 3 shows a state where the surface of the progressive multifocal lens is divided into lattice sections.

Then, in step 14, a surface 2 of the lens is, as shown in FIG. 3, divided into (M−1)×(N−1) lattice portions, and then x-axis and y-axis are determined to calculate coordinates P (i, j) of each of M×N lattice points. It is preferable that the distance between the lattice points be about 1 mm to about 4 mm. Although it can be considered that the surface of the lens can be optimized by shortening the distance between the lattice points, the amount of calculations for the design rapidly increases. If the optesthesia is considered, the wearer's sight cannot significantly be improved by optimizing the lens by using lattice points smaller than 1 mm. If the interval between the lattice points is longer than about 4 mm, the astigmatism curves may shake easily producing a portion having a large astigmatism in an intermediate portion or a near portion in which the refractive power is changed considerably.

After the coordinates of the lattice points have been determined, a ray tracing method is employed in step 15 so that the performance of each of the lattice sections surrounded by four lattice points in the lens is confirmed by a wearer's eye. When ray tracing is performed, the refraction of the reverse surface of the lens are sequentially and accurately traced and calculated as well as those of the surface of the lens so that the performance of the lens is obtained. Therefore, the difference in the astigmatism and the refractive power confirmed by the eye of the wearer can be calculated in the foregoing step so that the radius of curvature obtained in step 13 is corrected in such a manner that the difference in the distribution of the astigmatism and the refractive power for each section.

In step 16 the curved-surface equation is determined for each section in accordance with the corrected curvature radius. In this embodiment, the following bicubic expression is employed as the curved-surface equation.

$$f_{i,j}(x,y) = \sum_{m=0}^{3} \sum_{n=0}^{3} C_{m,n}(x - x_1)^m (y - y_i)^n \quad (1)$$

To determine sixteen (16) coefficients ($C_{m,n}$) of the foregoing curved-surface equation, conditions are introduced in step 17 to enable the curved surface of the lattice section to be smoothly connected to adjacent curved surfaces. That is, under condition that continuation to second-order differentiation is realized, that is, continuation of the curved-surface equation of each section is realized to the derivative of second order in the boundary, the curved-surface equation of each section is determined.

The procedure will now be described. X-axial directional coordinate sequences (N sequences) are subjected to spline interpolation to obtain the following linear derivative:

$$\frac{\delta z}{\delta x} \quad (2)$$

where $$z = f(x, y) \quad (3)$$

Moreover, the end conditions of P(1, 1) to P(1, N) and P(M, 1) to P(M, N) are obtained in such a manner that P(1, j), P(2, j), P(3, J) and P(M−2, j), P(M−1, j) and P(M, j) are circles. Similarly, y-axial directional coordinate sequences (M sequences) are subjected to spline interpolation to obtain the following linear derivative:

$$\frac{\delta z}{\delta y} \quad (4)$$

By using the foregoing equations, spline interpolation is performed to obtain the following derivative of second order:

$$\frac{\delta}{\delta x}\left[\frac{\delta z}{\delta y}\right] \quad (5)$$

The end conditions are as follows:

$$\frac{\delta}{\delta x}\left[\frac{\delta z}{\delta y}\right]_{1,j} = \frac{\delta}{\delta x}\left[\frac{\delta z}{\delta y}\right]_{2,j}$$

$$\frac{\delta}{\delta x}\left[\frac{\delta z}{\delta y}\right]_{M,j} = \frac{\delta}{\delta x}\left[\frac{\delta z}{\delta y}\right]_{M-1,j}$$

Therefore, a smooth curved surface can be formed on the surface of the lens under a condition that the following four values of each curved-surface equation, obtained as described above, are in the boundary of the lattice section, that is, at each point, are the same as the value of each of the adjacent curved-surface equations.

$$\left[z, \frac{\delta z}{\delta x}, \frac{\delta z}{\delta y}, \frac{\delta}{\delta x}\left[\frac{\delta z}{\delta y}\right]\right]$$

As a result, sixteen (16) conditional expressions are given as the boundary conditions of the lattice section surrounded by four points. Therefore, by solving the sixteen (16) simultaneous equations, all of the sixteen (16) coefficients of curved-surface equation (1) can be obtained. The curved surface obtained in step 17 and expressed by the curved-surface equation in the form of the bicubic expression is guaranteed to be C2-class connected (continuous to second-order differentiation) in the boundary of each section. Therefore, a similar procedure is applied to all of the lattice sections to obtain a curved-surface equation for each section. When the surface shape of the lens is expressed by the obtained curved-surface equations, a smooth surface of the lens can be obtained. As a matter of course, the curved-surface equations may be obtained in such a manner that higher derived functions are continuous in the boundary of the sections.

Each section has been given a predetermined curvature in accordance with the basic specification of the progressive multifocal lens and various design concepts, the given curvature being corrected by the ray tracing method. Therefore, by machining the surface of the lens to have the surface shape in accordance with the curved-surface equation for each section obtained in step 17, an optimum progressive multifocal lens can be manufactured.

This embodiment has a structure such that if a check of the performance of the surface shape obtained in step 17 in view of the astigmatism curves and the like results in an improvement in the required performance, the curvature of an appropriate section can be reset in step 18. After it has been reset, the operation returns from step 19 to step 15 in which the foregoing steps are repeated so that a curved-surface equation for realizing a progressive multifocal lens having improved performance is obtained. When the foregoing steps are repeated, the manufacturing method according to this embodiment simply requires the curved-surface equation of the reset section and those of the surrounding sections affected by the subject section being again calculated to obtain the overall surface shape of the lens. Therefore, the necessity of performing calculations for all sections to again determine the curved-surface equations can be eliminated so that an optimum surface shape of the lens is obtained in a short period of time. If the overall curved surface is expressed by a higher polynomial, change of a portion of the curvature results in the conditions of the curved-surface equation being changed. Therefore, all calculation must be again performed to obtain new polynomials. Accordingly, a method of partially correcting the surface of a lens obtained by the conventional method to optimize the surface shape cannot actually be employed. However, with the method according to this embodiment, if the surface of the lens is partially corrected, the correction does not affect the overall refracted surface. That is, correction can be performed without influence of the state of correction of the other portions. Thus, repetition of corrections by the foregoing method enables an optimum surface of the lens to be easily obtained.

If a determination has been performed in step 19 that an optimum surface of the lens has been obtained, the obtained curved-surface equations are converted into numerical data in step 20. Then, a surface of the lens having the surface shape according to the curved-surface equation is formed.

A plurality of progressive multifocal lenses manufactured by the foregoing manufacturing method will now be described together with lenses manufactured by the conventional method for comparison.

[First Embodiment]

Figure 4:
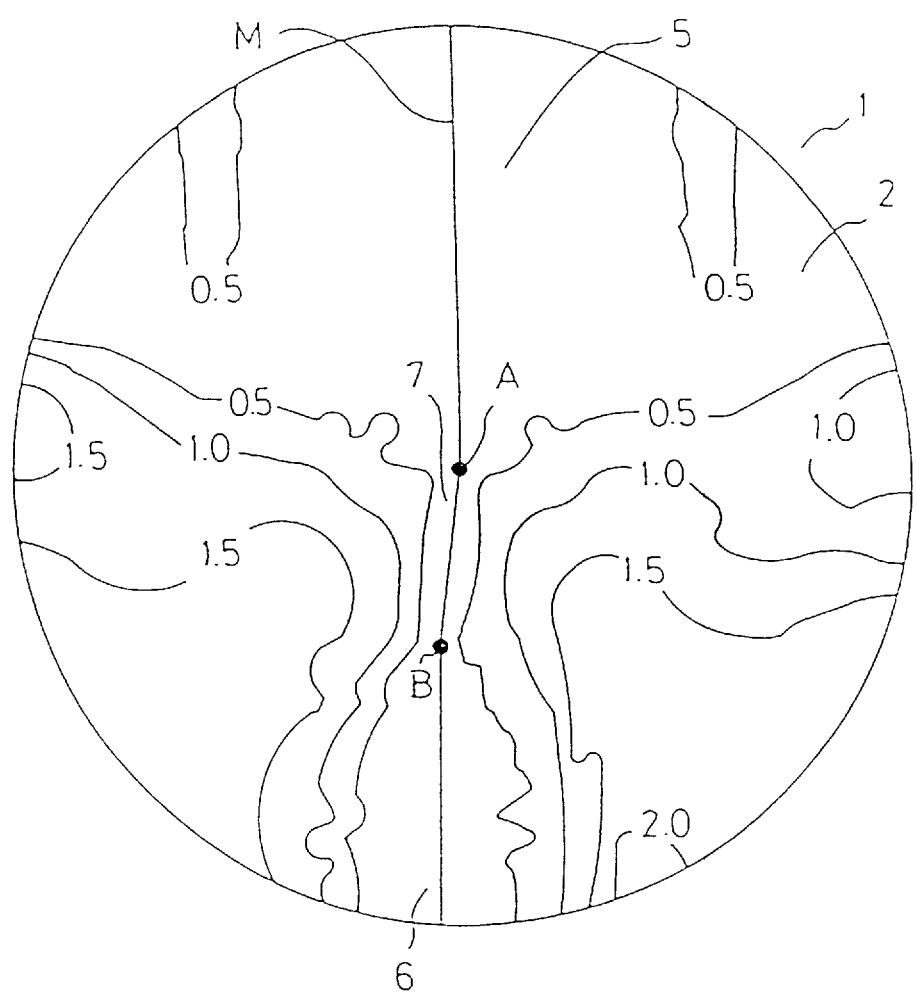
FIG. 4 shows astigmatisms of a progressive multifocal lens manufactured by a conventional method according to a first embodiment.
Figure 5:
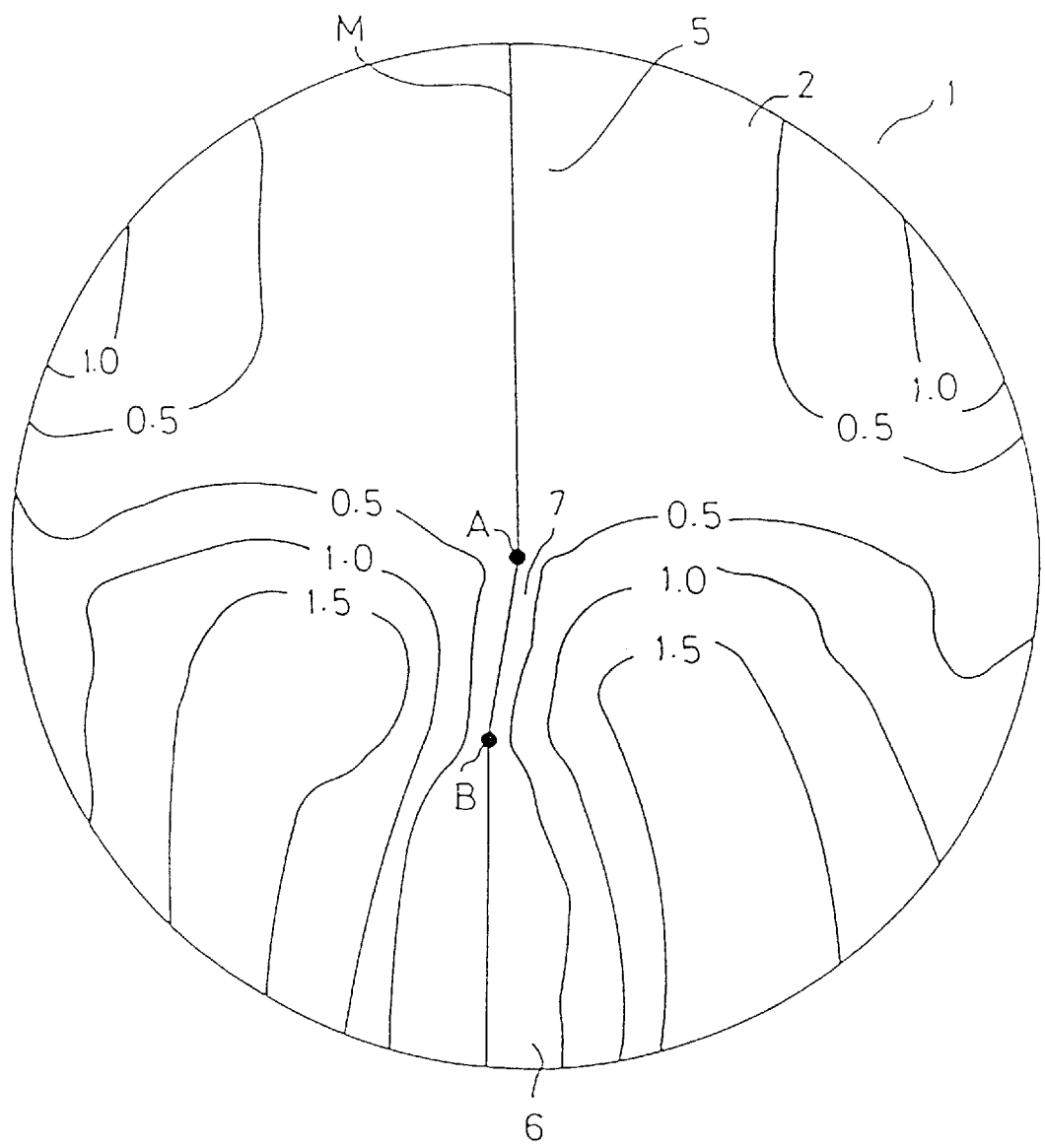
FIG. 5 is a graph showing astigmatisms of a progressive multifocal lens manufactured by a method according to the present invention according to the first embodiment.
Figure 6:
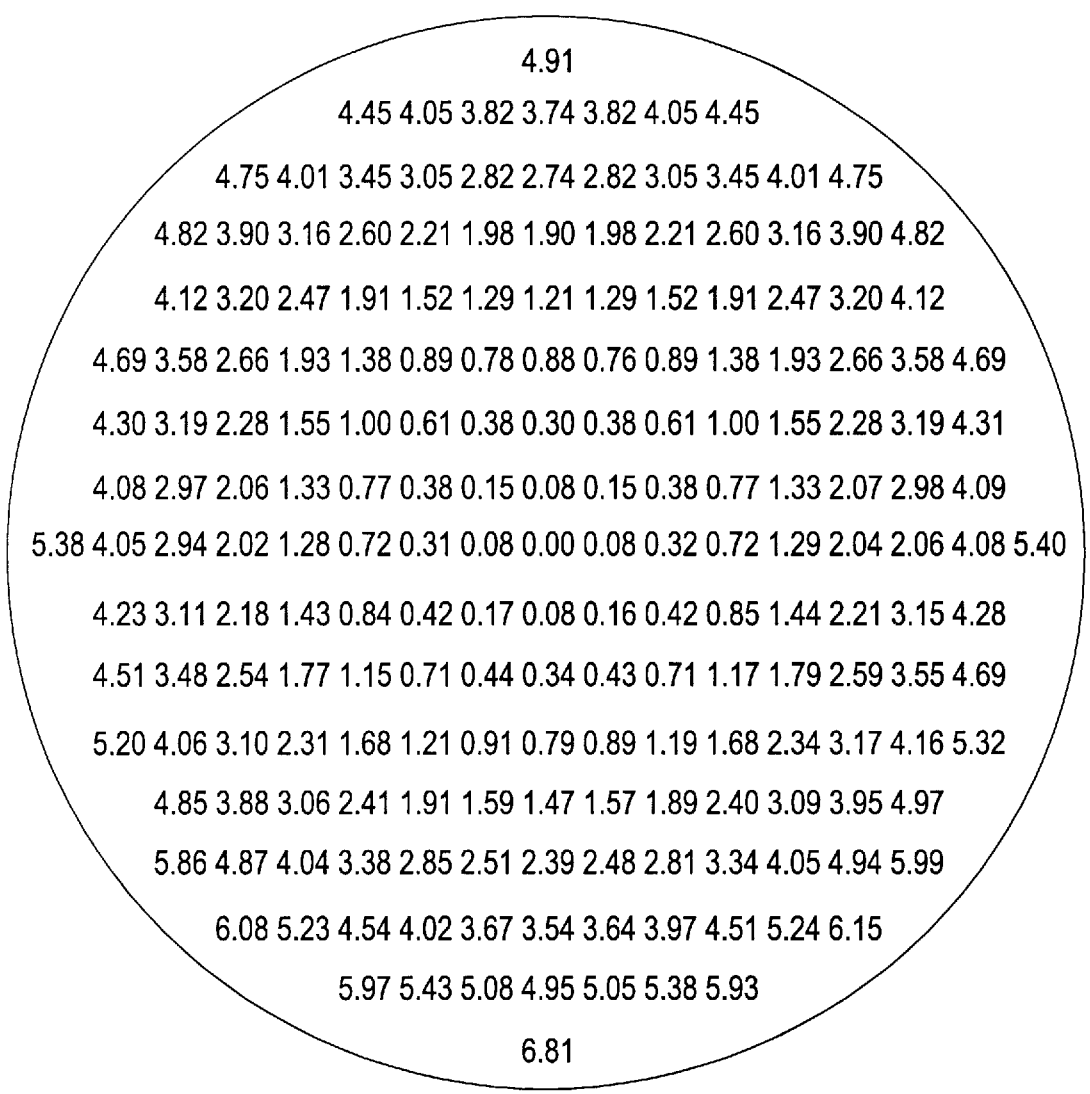
FIG. 6 shows coordinates of the progressive surface of the progressive multifocal lens shown in FIG. 5.

FIGS. 4 and 5 show astigmatism curves of progressive multifocal lenses, the basic specification of which is such that the base curve is 4 diopter (D), addition power is 2 D and the refractive power is 1.66. The shown astigmatism curves are obtained such that the difference in the curvature at each point on the reverse surface (having a main meridian curve) of the lens is obtained as the astigmatism of the surface; and points having the surface astigmatisms were connected by curves. FIG. 4 shows the surface astigmatism curves of the surface of a lens manufactured by a conventional polynomial of twelve degree. FIG. 5 shows the astigmatism curves of the surface of a lens manufactured by the method according to the present invention in such a manner that the surface of the lens is divided into 2 mm×2 mm lattice sections. FIG. 6 shows the coordinates of the progressive surface of the progressive multifocal lens according to this embodiment in such a manner that the pitch in the x and y directions is 5 mm.

The progressive multifocal lenses shown in FIGS. 4 and 5 are progressive multifocal lenses having the clear static sight and dynamic sight in a distance portion 5 and clear static sight in a near portion 6. Thus, the lenses are designed to provide a relatively large clear field of vision for the distance portion 5 and relatively smooth astigmatism curves are obtained in the intermediate portion 7. However, the astigmatism curves near the distance design reference point A of the progressive multifocal lens obtained by the conventional method have irregular portions. Moreover, the astigmatism curves adjacent to the clear field of vision in the near portion 6 have irregular portions. Therefore, it can be considered that use of the foregoing progressive multifocal lens encounters movement of the sight. Moreover, each of the portions having an astigmatism of 2.0 D exists.

On the other hand, as can be understood from the astigmatism curves shown in FIG. 5, the progressive multifocal lens manufactured by the method according to this embodiment has reduced irregular portions of the astigmatism curves near the distance design reference point A. Thus, no irregular portion was confirmed. Moreover, astigmatism curves, each having a surface astigmatism of 0.5 D near the boundary between the distance portion 5 and the intermediate portion 7, extend downwards to positions near the outer end of the lens. Therefore, the clear field of vision in the distance portion 5 is enlarged and clear sight without movement can be obtained. Moreover, the astigmatism curves are smooth in the intermediate portion 7 so that movement of the sight produced in the foregoing portion is prevented. By manufacturing the progressive multifocal lens by the method according to this embodiment, the portion having the surface astigmatism of 2.0 D can be eliminated. Therefore, a progressive multifocal lens having improved astigmatisms over the surface of the lens can be provided. During the process for manufacturing the progressive multifocal lens according to this embodiment, the astigmatism is locally corrected. The correction causes smoother astigmatism curves to be realized. Moreover, the astigmatism curves in the side portion of the lens are caused to run downwards so that a larger clearer field of vision is obtained. As described above, the present invention enables an optimum lens having the minimized astigmatism to be obtained. Since the local correction can easily be performed, the lens can be further optimized. Thus, a progressive multifocal lens exhibiting excellent performance can be provided in a short period of time.

Figure 7:
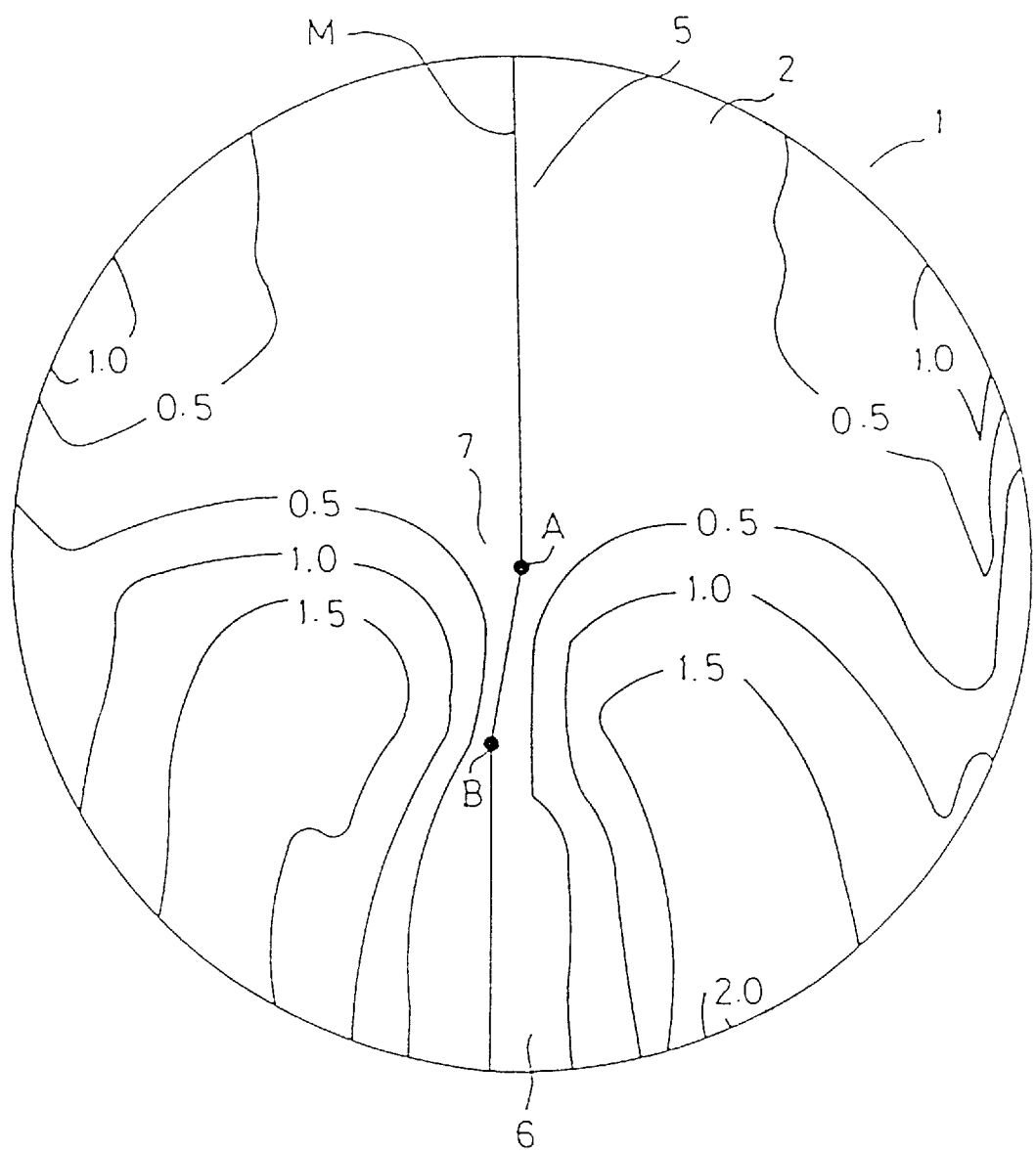
FIG. 7 shows astigmatisms of a progressive multifocal lens manufactured by using 3 mm×3 mm lattice sections according to the first embodiment.

FIG. 7 shows astigmatism curves of a progressive multifocal lens having the basic specification similar to that of the foregoing lens and manufactured by the method according to the present invention in such a manner that the surface is divided into 3 mm×3 mm lattice sections. As can be understood from the figure above, if the 3 mm×3 mm lattice sections are used, a progressive multifocal lens having a smooth astigmatism can be manufactured. Therefore, generation of irregular portions of the astigmatism curves near the distance design reference point A can also be prevented in this example. Moreover, the curve having the astigmatism of 0.5 D is caused to run downwards in the periphery of the lens so that a large clear field of vision is obtained.

Figure 8:
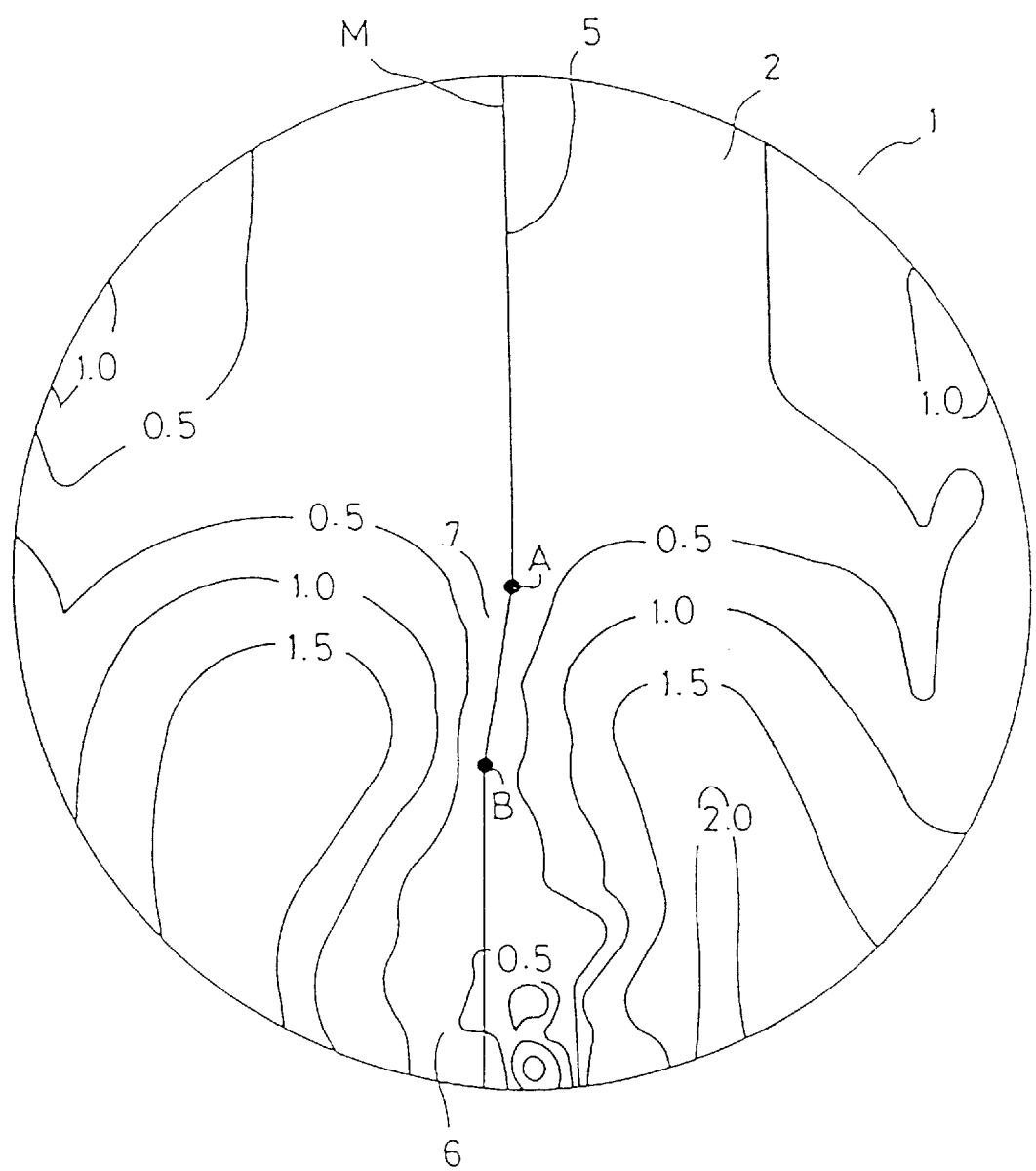
FIG. 8 shows astigmatisms of a progressive multifocal lens manufactured by using 4 mm×4 mm lattice section according to the first embodiment.

FIG. 8 shows astigmatism curves of a progressive multifocal lens having the basic specifications similar to that of the foregoing lens and manufactured by the method according to the present invention in such a manner that the surface was divided into 4 mm×4 mm lattice sections. As can be understood from the figure above, if the 4 mm×4 mm lattice sections are used, a progressive multifocal lens having a smooth astigmatism can be manufactured. Moreover, generation of irregular portions of the astigmatism curves near the distance design reference point A can be prevented.

As can be understood from FIGS. 7 and 8, the surface is divided into lattice sections, one side of which is about 4 mm to determine the curved-surface equation for each section so as to form the surface of the lens. As a result, a progressive multifocal lens having smooth astigmatism curves can be obtained. If the optesthesia is considered, significant improvement cannot be obtained in a case where the surface is divided into lattice sections, the one side of which is about less than 1 mm. Therefore, it is preferable that the surface be divided into about 1 mm to 4 mm×1 mm to 4 mm lattice sections to obtain the curved-surface equations. In a case where the surface is divided into lattice sections, the one side of which is about 4 mm, which is in the foregoing range, a portion having a surface astigmatism of 2.0 D appears as can be understood from FIG. 8. Therefore, it can be understood that division of the surface into lattice sections, one side of which is about 4 mm or shorter, that is, about 1 mm to about 3 mm to obtain the curved-surface equations enables a progressive multifocal lens, in which the astigmatism over the lens surface is prevented.

As can be understood from FIGS. 5 and 7, division of the surface into lattice sections, the one side of which is about 3 mm, results in the curve of the astigmatism of 0.5 D to run downwards in the periphery of the lens and the curve is again raised. Thus, the clear field of vision is somewhat reduced. Therefore, it can be understood that division of the surface into lattice sections, one side of which is about 3 mm or shorter, that is, about 1 mm to about 2 mm to obtain the curved-surface equations, enables a progressive multifocal lens having a large clear field of vision and a clearer sight. Although the lattice sections are employed in this embodiment, the sections, of course, are not limited to the lattice sections. If an employed shape is able to continuously divide the surface of the lens, the surface may be divided into any polygonal shape. Moreover, the shapes of the sections may be changed for respective portions depending upon the shape of the lens, distance portion and the near portion.

In general, obtaining of the curved-surface equation by dividing the surface into small sections enables the surface shape of the lens to be easily optimized. Therefore, in the case of the progressive multifocal lens having a large clear field of vision in the distance portion according to this embodiment, it is effective to divide the distance portion into relatively large sections, for example, lattice sections, the one side of which is about 3 mm to about 4 mm, to obtain curved-surface equations. Moreover, the near portion is divided into relatively small sections, for example, lattice sections, one side of which is about 2 mm to about 3 mm, to obtain curved-surface equations. Moreover, the intermediate portion having the refractive power which is changed progressively may be divided into smaller sections, for example, lattice sections, one side of which is about 1 mm to 2 mm, to obtain curved-surface equations. By changing the sizes of the sections depending upon the distribution of the refractive power and the astigmatism to obtain the curved-surface equations as described above, an optimum surface shape of a lens can be formed in a short period of time.

[Second Embodiment]

Figure 9:
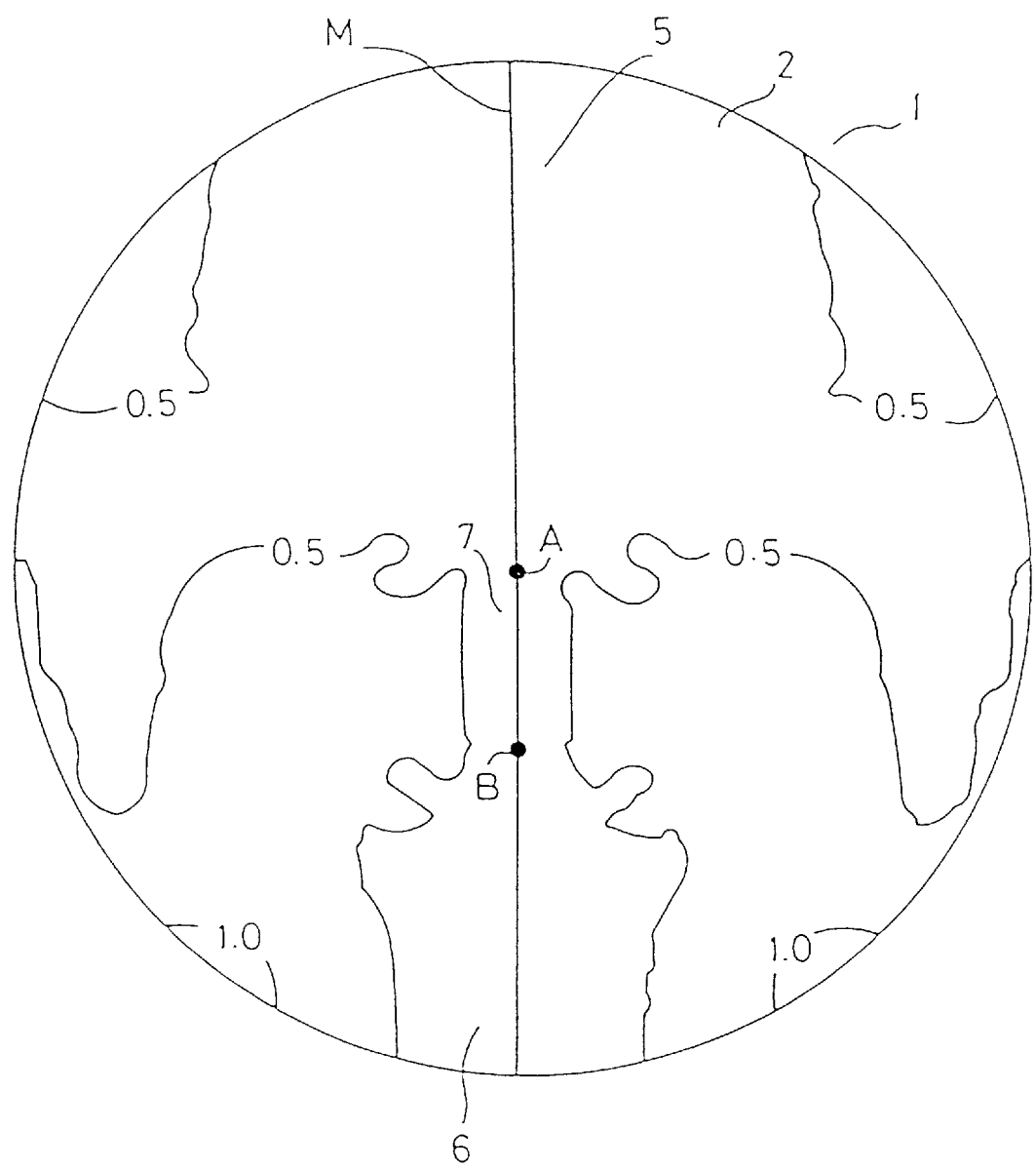
FIG. 9 shows astigmatisms of a progressive multifocal lens manufactured by a conventional method according to a second embodiment of the method of the present invention.
Figure 10:
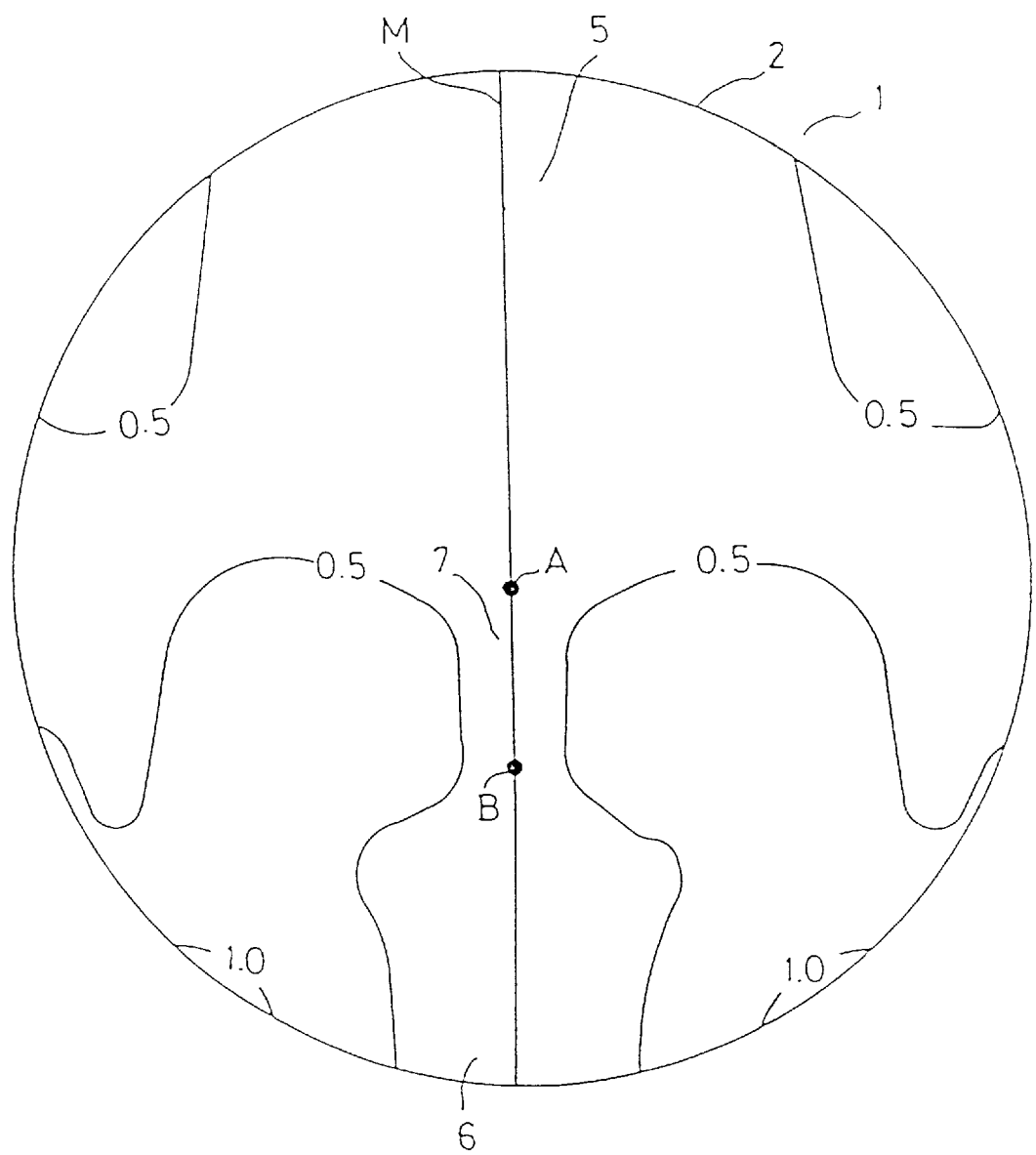
FIG. 10 shows astigmatisms of a progressive multifocal lens manufactured by the method according to the second embodiment of the present invention.

FIGS. 9 and 10 show astigmatism curves of progressive multifocal lenses, the basic specification of which is such that the base curve is 6 D, addition power is 1 D and the refractive power is 1.5. FIG. 9 shows the astigmatism curves of a lens manufactured by a conventional higher polynomial. FIG. 10 shows the astigmatism curves of the surface of a lens manufactured by the method according to the present invention in such a manner that the surface of the lens is divided into 2 mm×2 mm lattice sections to obtain the curved-surface equation.

The progressive multifocal lenses shown in FIGS. 9 and 10 are progressive multifocal lenses designed in such a manner that the boundary lines of the intermediate portion are moved vertically to prevent change in the astigmatism in the intermediate portion. The lens shown in FIG. 9 has a large clear field of vision from the distance portion to the intermediate portion. Thus, it can be understood that the foregoing lens has a light and clear sight. However, irregular portions exist in the astigmatism curves near the distance design reference point A. Thus, it can be considered that movement of an image appears during sight. On the other hand, the progressive multifocal lens shown in FIG. 10 and according to the present invention, as a matter of course, has a large clear field of vision. Moreover, the irregular portions in the astigmatism curves near the distance design reference point A can be prevented. As a result of the present invention, a smooth astigmatism can be obtained. Therefore, a progressive multifocal lens having both large and light static sight and a dynamic sight free from moving images can be provided.

[Third Embodiment]

Figure 11:
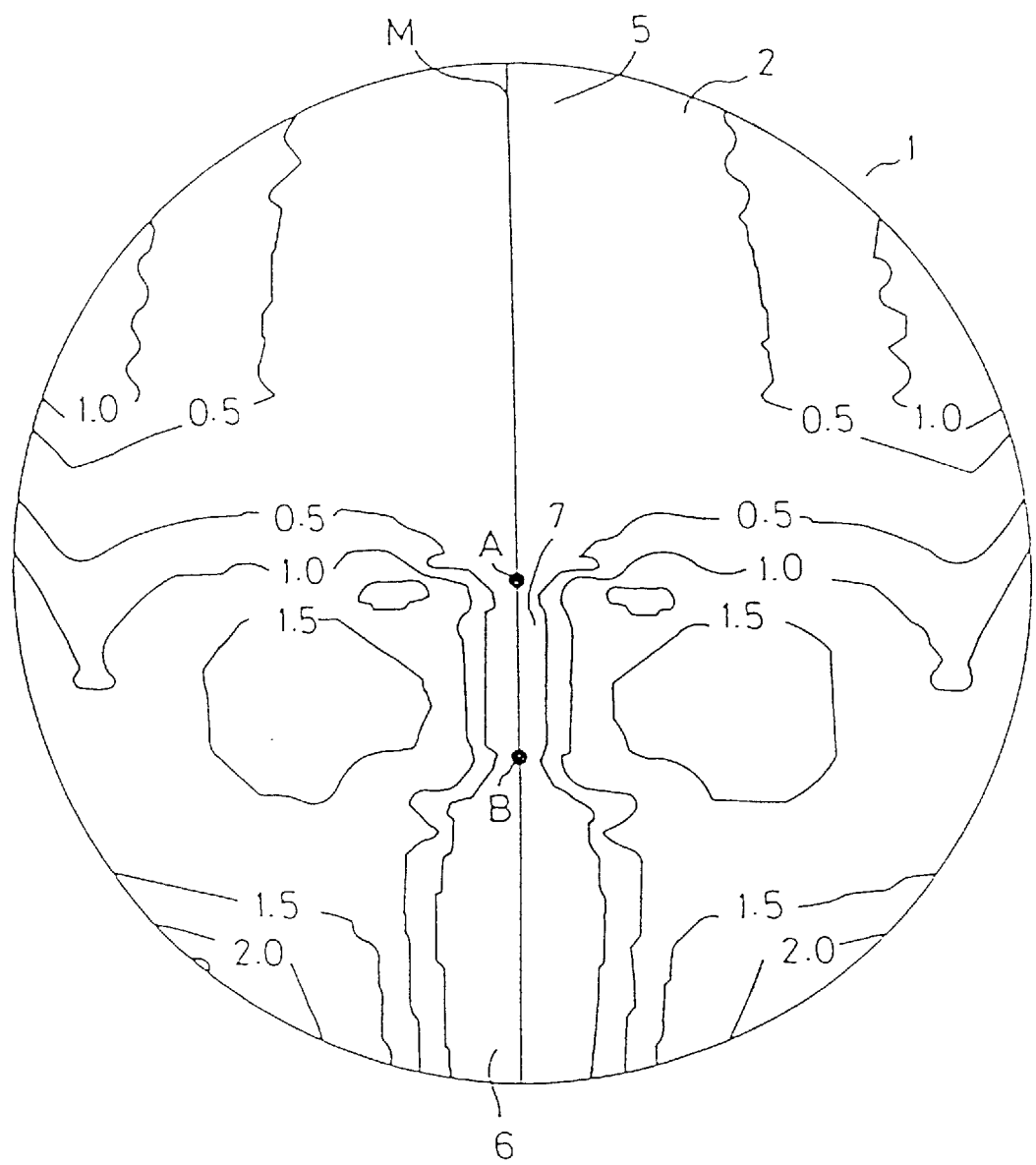
FIG. 11 shows astigmatisms of a progressive multifocal lens manufactured by a conventional method according to a third embodiment.
Figure 12:
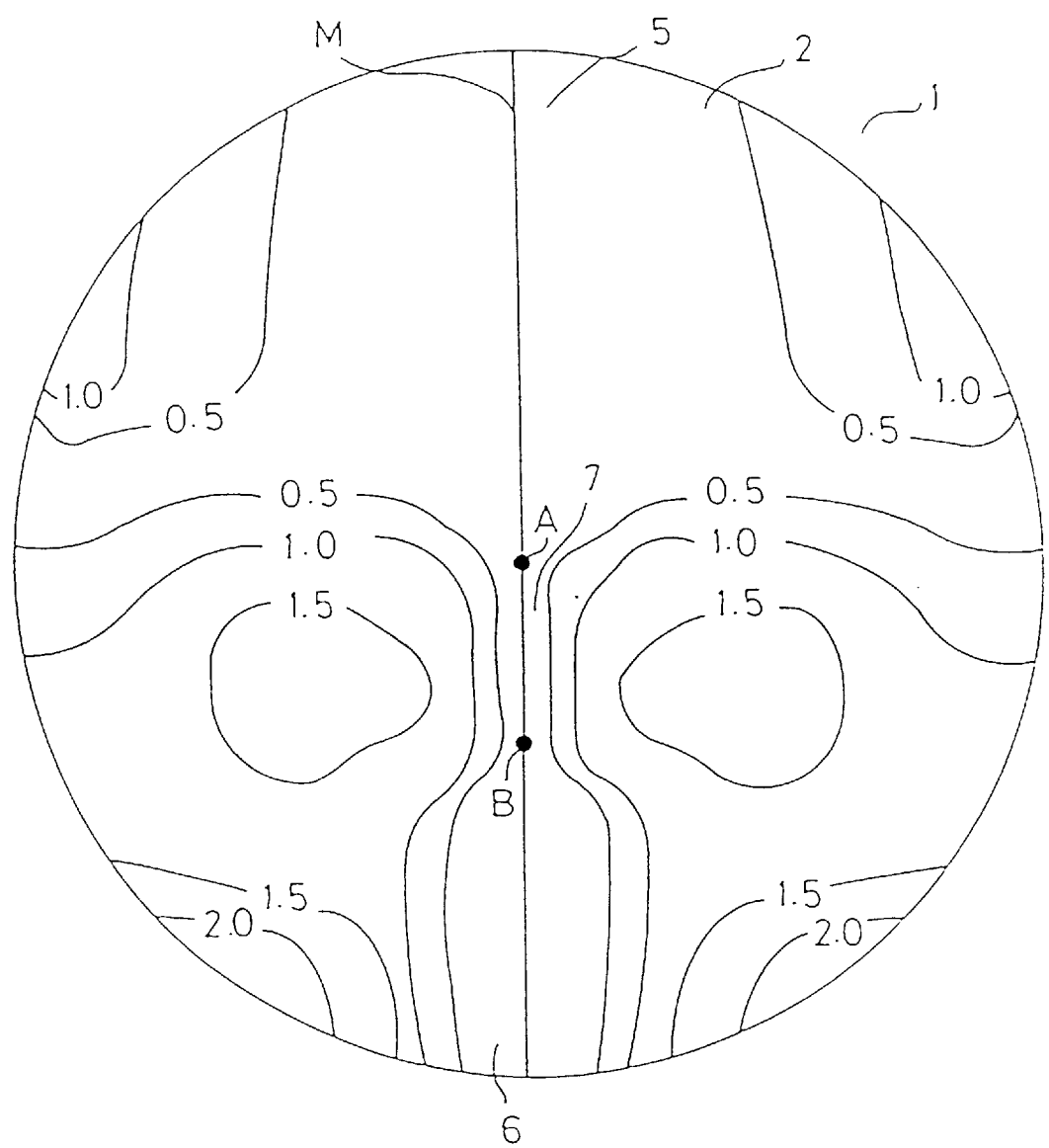
FIG. 12 shows astigmatisms of a progressive multifocal lens manufactured by a method according to the third embodiment of the present invention.

FIGS. 11 and 12 show astigmatism curves of progressive multifocal lenses, the basic specification of which is such that the base curve is 6 D, addition power is 2 D and the refractive power is 1.5. FIG. 11 shows the astigmatism curves of a lens manufactured by a conventional higher polynomial. FIG. 12 shows the astigmatism curves of the surface of a lens manufactured by the method according to the present invention in such a manner that the surface of the lens is divided into 2 mm×2 mm lattice sections to obtain the curved-surface equations.

The progressive multifocal lenses according to this embodiment are lenses manufactured in accordance with the same design concept as that of the second embodiment. However, as can be understood from FIG. 11, if the addition power is enlarged, the lens manufactured by the conventional method encounters a consideration that the astigmatism curves are bent upwards in the periphery of the lens, thus resulting in the clear field of vision to be reduced. Moreover, irregular portions of the astigmatism curves exist near the distance design reference point A and the irregular range is enlarged. On the other hand, the progressive multifocal lens shown in FIG. 12 and according to the present invention has the astigmatism curves running downwards in the periphery thereof so that a large clear field of vision is attained. Moreover, no irregular portion exists in the astigmatism near the distance design reference point A. As described above, the present invention enables a progressive multifocal lens in accordance with the design concept to be obtained even if the progressive multifocal lens has a large addition power.

[Fourth Embodiment]

Figure 13:
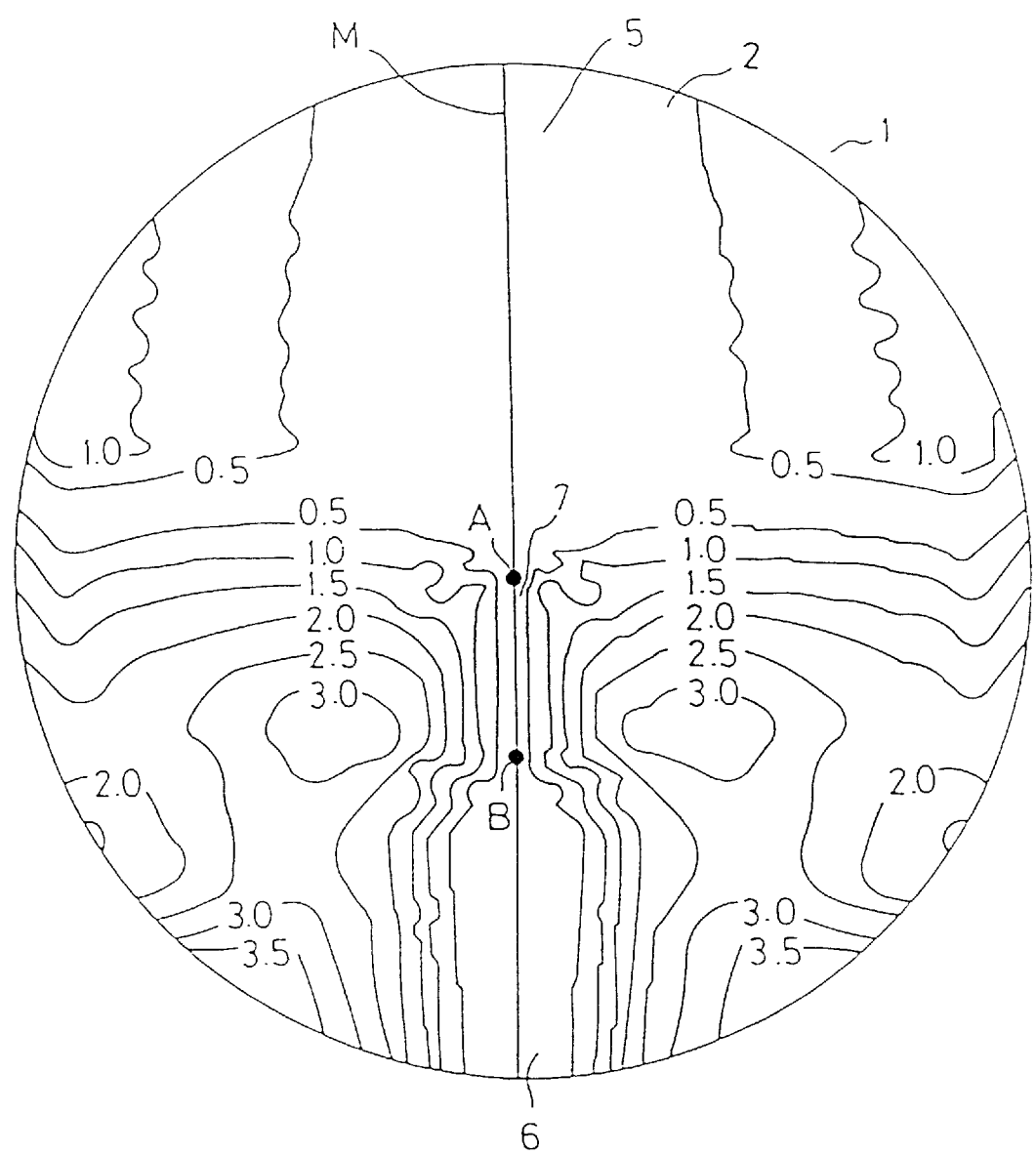
FIG. 13 shows astigmatisms of a progressive multifocal lens manufactured by a conventional method according to a fourth embodiment.
Figure 14:
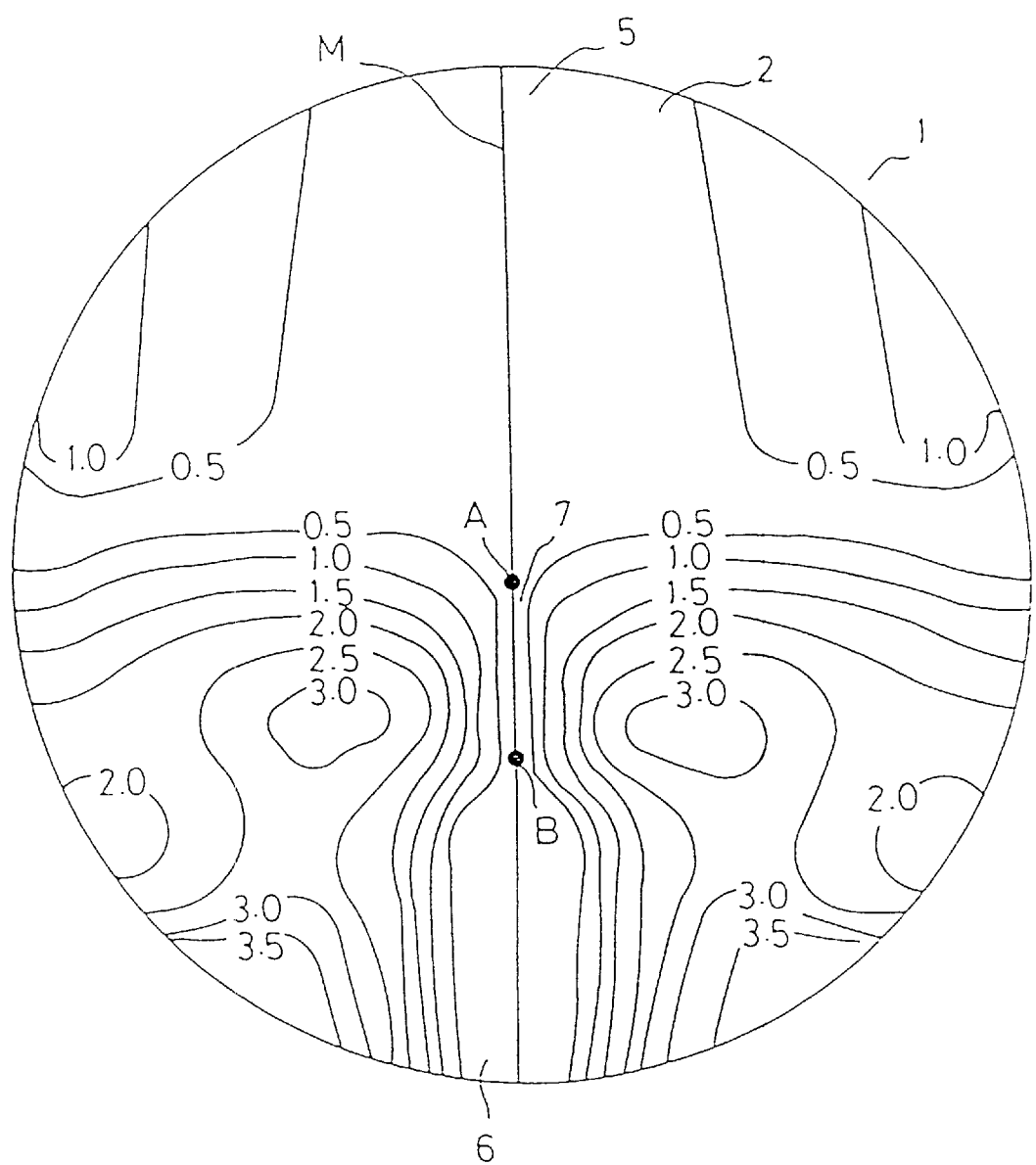
FIG. 14 shows astigmatisms of a progressive multifocal lens manufactured by a method according to the fourth embodiment of the present invention.

FIGS. 13 and 14 show astigmatism curves of progressive multifocal lenses, the basic specification of which is such that the base curve is 6 D, addition power is 3 D and the refractive power is 1.5. FIG. 13 shows the astigmatism curves of the lens manufactured by using a conventional higher polynomial. FIG. 14 shows the astigmatism curves of the surface of a lens manufactured by the method according to the present invention in such a manner that the surface of the lens is divided into 2 mm×2 mm lattice sections to obtain the curved-surface equation.

The progressive multifocal lenses according to this embodiment are lenses manufactured in accordance with the same design concept as that of the second embodiment. However, a lens of a type having the addition power cannot be manufactured by the conventional method to have satisfactory performance. As can be understood from FIG. 13, excessive irregular portions appear in the astigmatism curves near the distance design reference point A and the near design reference point B. On the other hand, the progressive multifocal lens shown in FIG. 14 and according to the present invention enables the irregular portions in the astigmatism curves to be prevented near the distance design reference point A and the near design reference point B. Moreover, the progressive multifocal lens according to the present invention attains smooth astigmatism curves over the surface thereof as well as the foregoing portions. Therefore, the present invention enables a progressive multifocal lens having a large addition power to be obtained which has satisfactory performance.

[Fifth Embodiment]

Figure 15:
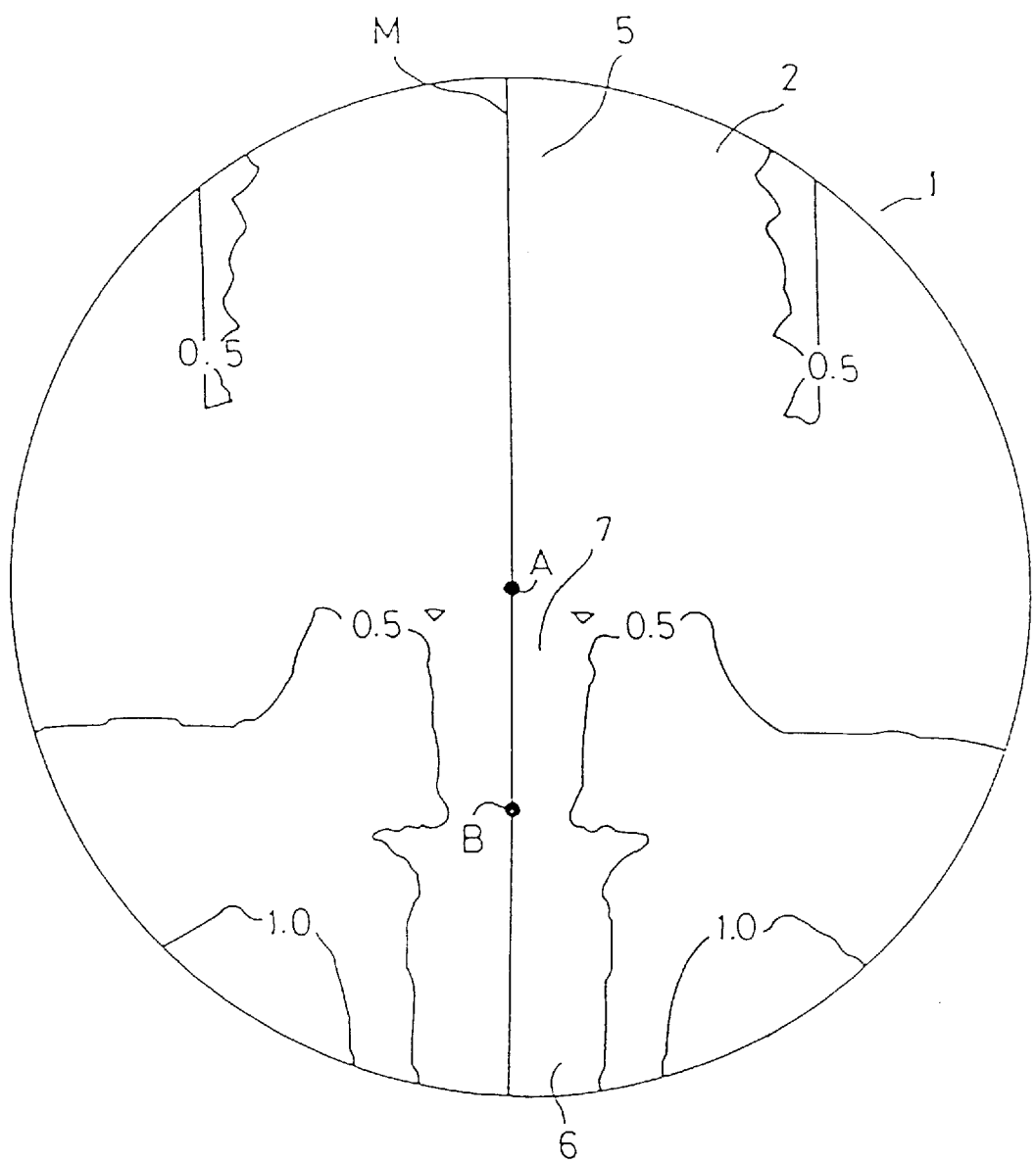
FIG. 15 shows astigmatisms of a progressive multifocal lens manufactured by a conventional method according to a fifth embodiment.
Figure 16:
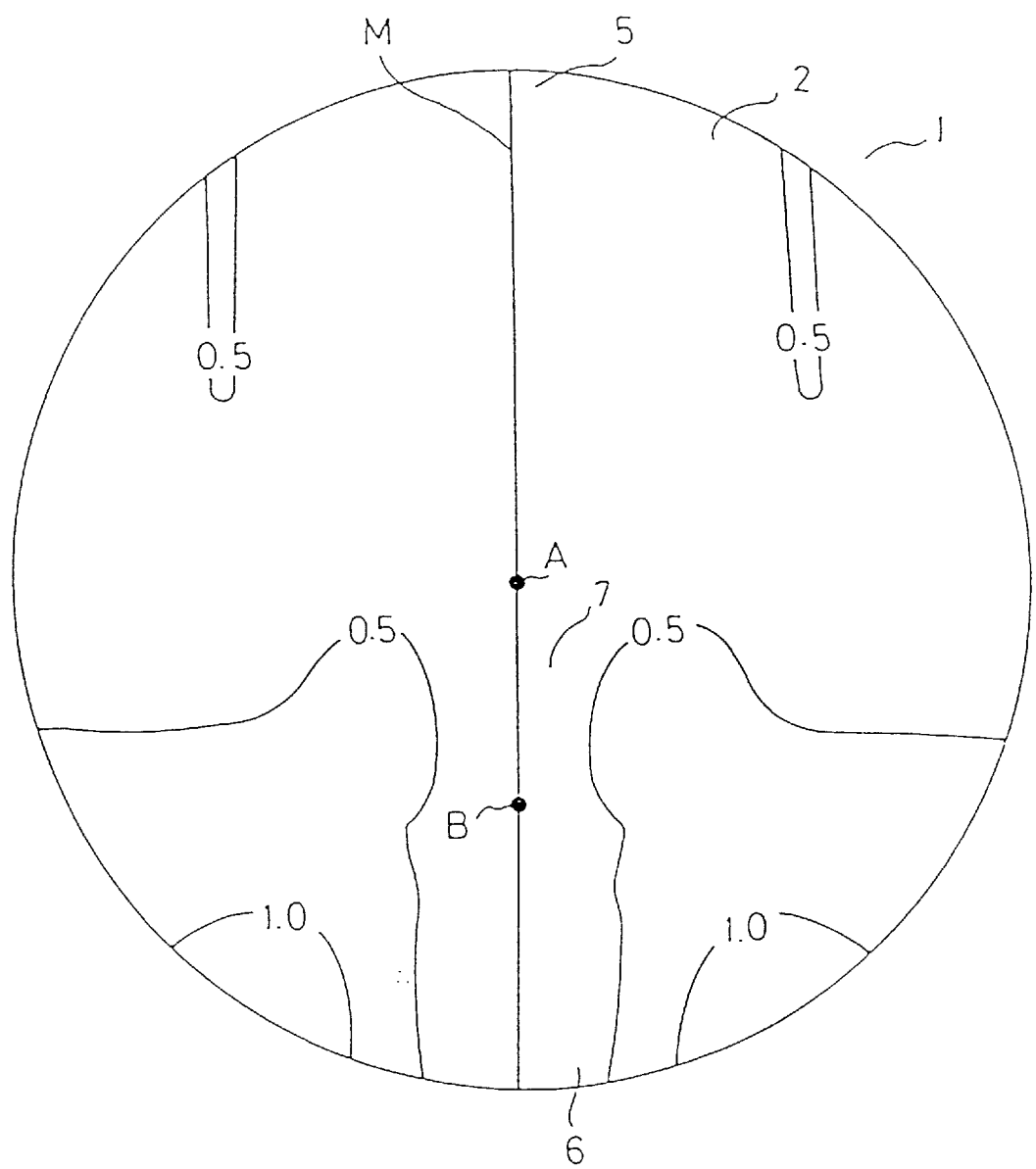
FIG. 16 shows astigmatisms of a progressive multifocal lens manufactured by a method according to the fifth embodiment of the present invention.

FIGS. 15 and 16 show astigmatism curves of progressive multifocal lenses, the basic specification of which is such that the base curve is 4.5 D, addition power is 1 D and the refractive power is 1.5. FIG. 15 shows the astigmatism curves of the lens manufactured by using a conventional higher polynomial. FIG. 16 shows the astigmatism curves of the surface of a lens manufactured by the method according to the present invention in such a manner that the surface of the lens is divided into 2 mm×2 mm lattice sections to obtain the curved-surface equation.

The progressive multifocal lenses according to this embodiment are lenses designed in accordance with a design concept to improve the intermediate field of vision and the distance field of vision by elongating the progressive zone to prevent change in the refractive power. The lens shown in FIG. 15 has a curve having the surface astigmatism of 0.5 D which is located in the lower portion of the lens. Therefore, it can be understood that a very large clear field of vision is attained from the distance portion to the intermediate portion. However, somewhat irregular portions exist in the astigmatism curves. On the other hand, the progressive multifocal lens shown in FIG. 16 and according to the present invention has a clear field similar to that obtainable from the conventional lens. Moreover, the astigmatism curves have no irregular portion and are very smooth. As described above, even if a progressive multifocal lens having satisfactory performance can be manufactured by the conventional method, employment of the present invention enables a progressive multifocal lens having improved performance to be provided.

[Sixth Embodiment]

Figure 17:
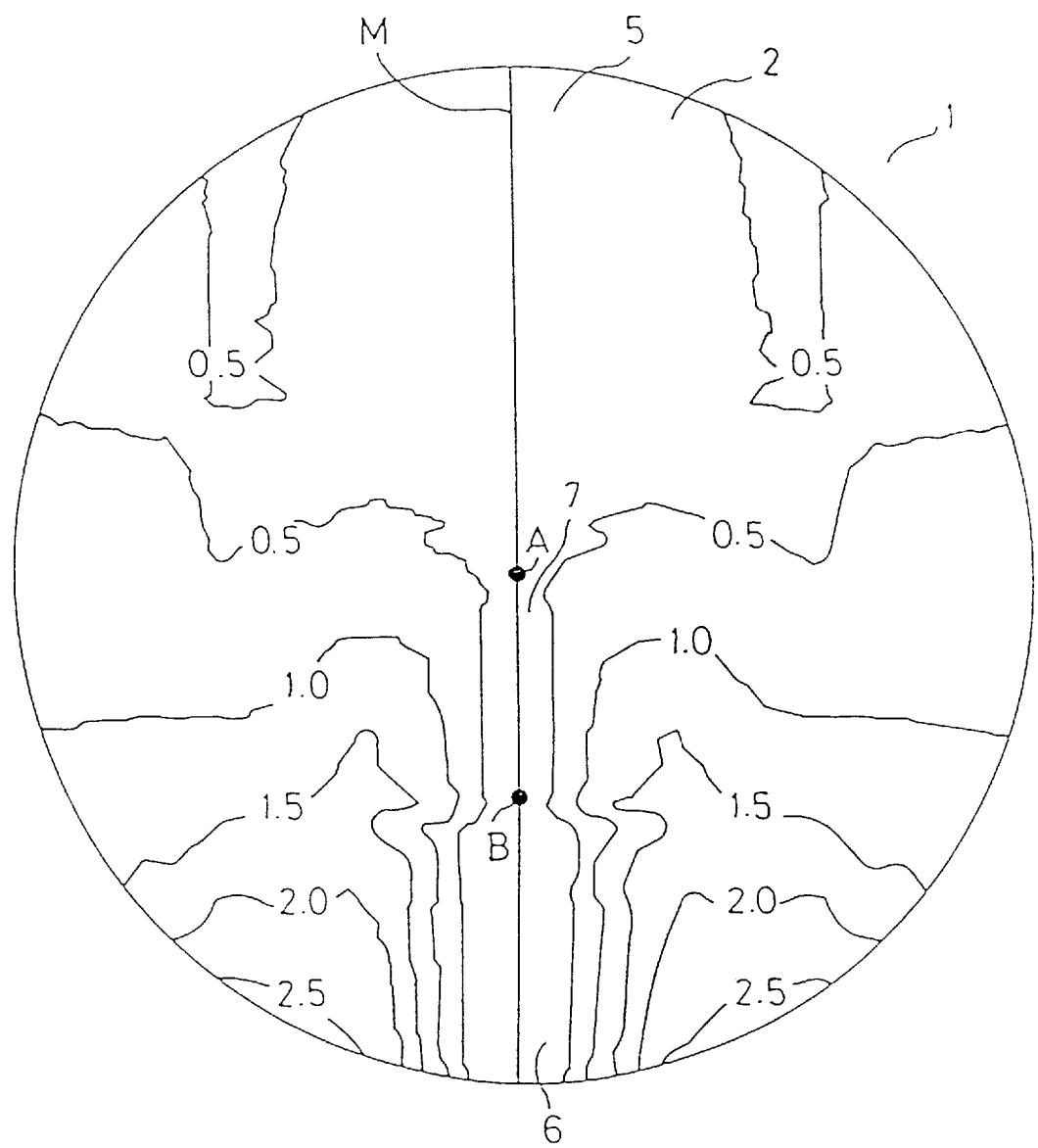
FIG. 17 shows astigmatisms of a progressive multifocal lens manufactured by a conventional method according to a sixth embodiment.
Figure 18:
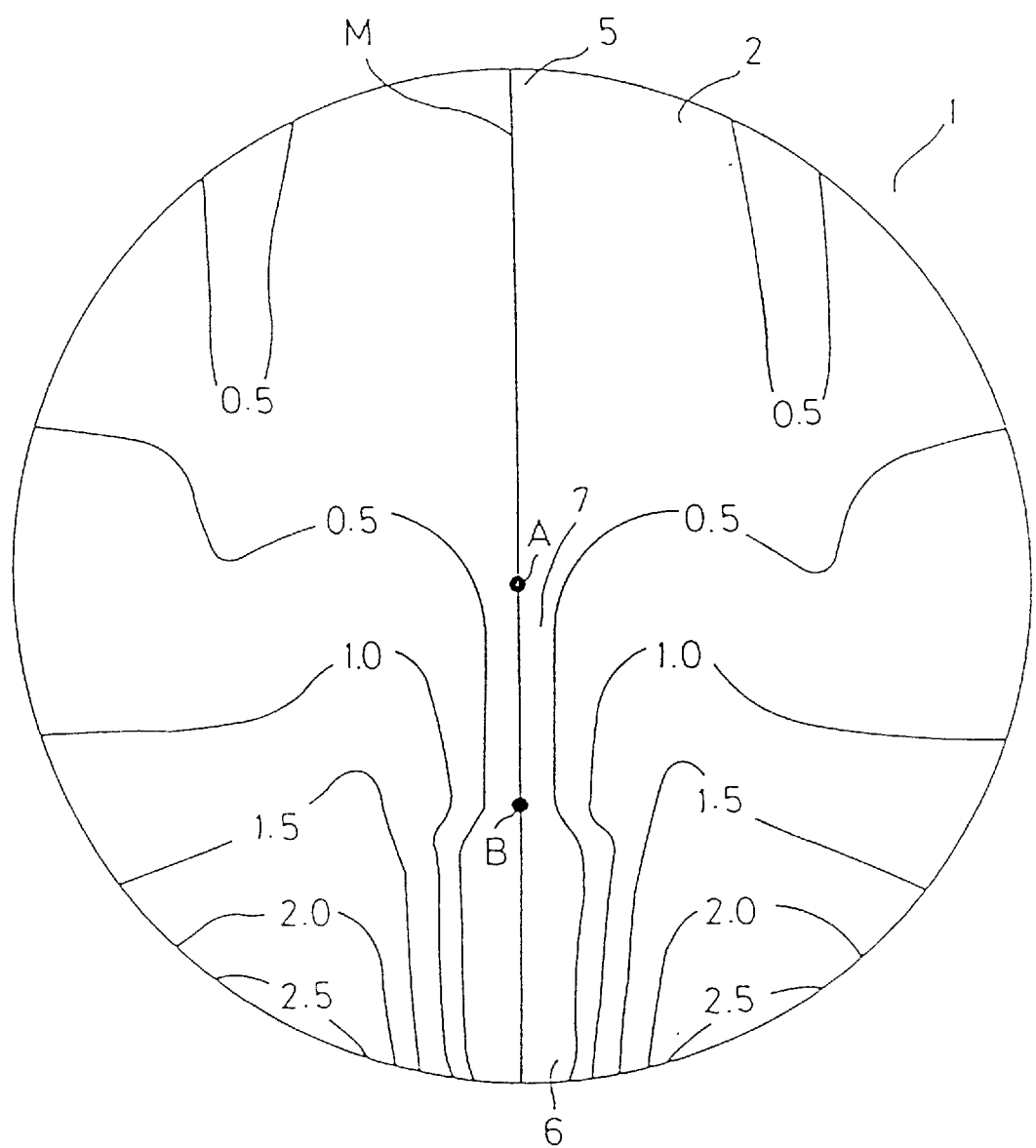
FIG. 18 shows astigmatisms of a progressive multifocal lens by a method according to the sixth embodiment of the present invention.

FIGS. 17 and 18 show astigmatism curves of progressive multifocal lenses, the basic specification of which is such that the base curve is 4.5 D, addition power is 2 D and the refractive power is 1.5. FIG. 17 shows the astigmatism curves of the lens manufactured by using a conventional higher polynomial. FIG. 18 shows the astigmatism curves of the surface of a lens manufactured by the method according to the present invention in such a manner that the surface of the lens is divided into 2 mm×2 mm lattice sections to obtain the curved-surface equation.

The progressive multifocal lenses are lenses manufactured in accordance with the same design concept as that of the fifth embodiment. However, the lens shown in FIG. 17 and manufactured by the conventional method has an enlarged addition power so that irregular portions are generated in the astigmatism curves in the vicinity of the distance design reference point A. Thus, it can be understood that the performance of the lens deteriorates. On the other hand, the lens shown in FIG. 18 and manufactured by the method according to the present invention has no irregular portion in the astigmatism curves near the distance design reference point A. Moreover, smooth astigmatism curves are obtained at long intervals from the distance portion to the intermediate portion. It can be understood that an excellent field of vision, which is free from change in the refractive power and in the astigmatism, can be obtained in the foregoing portion. As described above, the progressive multifocal lens manufactured by the method according to the present invention enables an optimum lens in accordance with the design concept to be provided.

[Seventh Embodiment]

Figure 19:
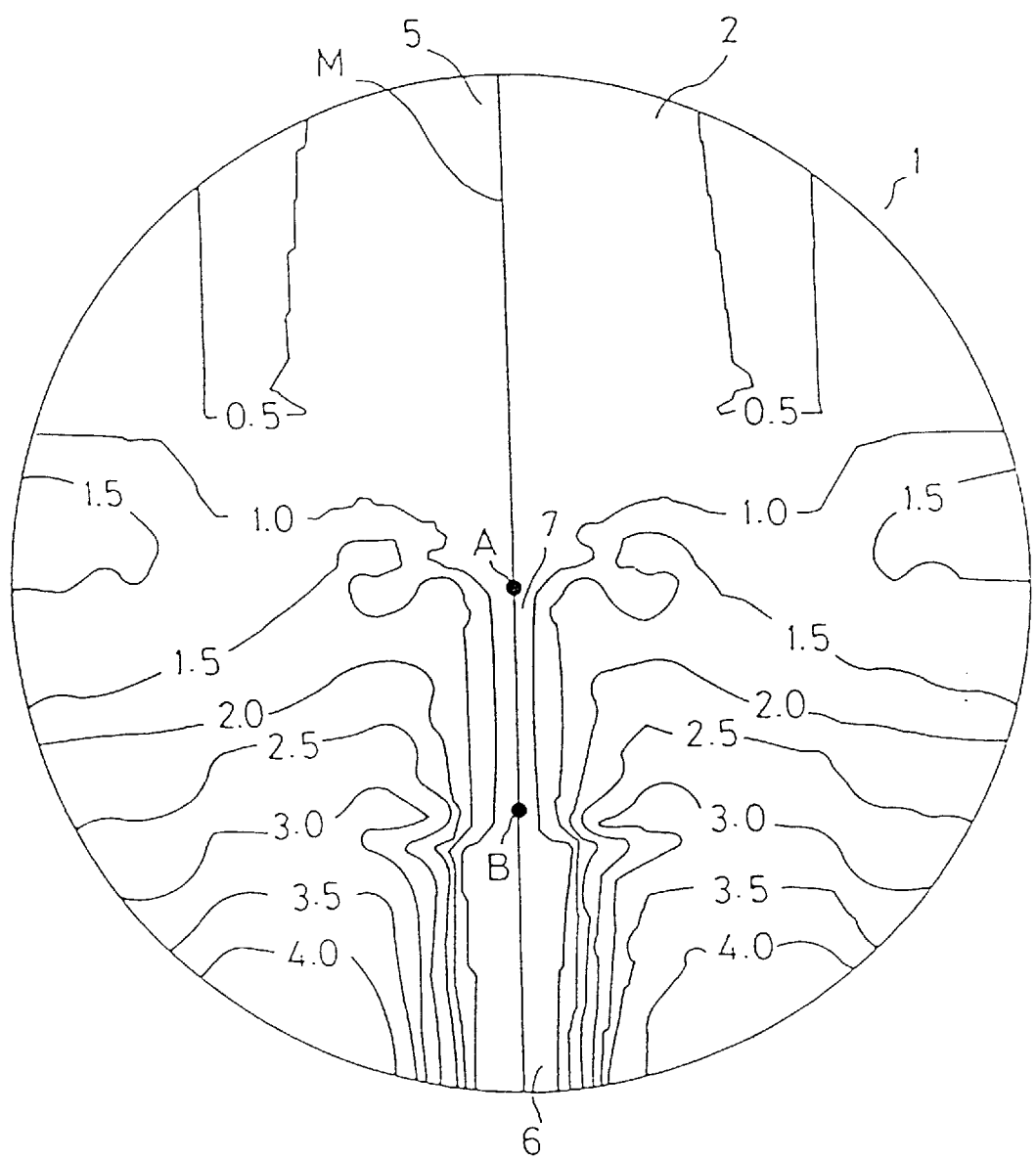
FIG. 19 shows astigmatisms of a progressive multifocal lens manufactured by a conventional method according to a seventh embodiment.
Figure 20:
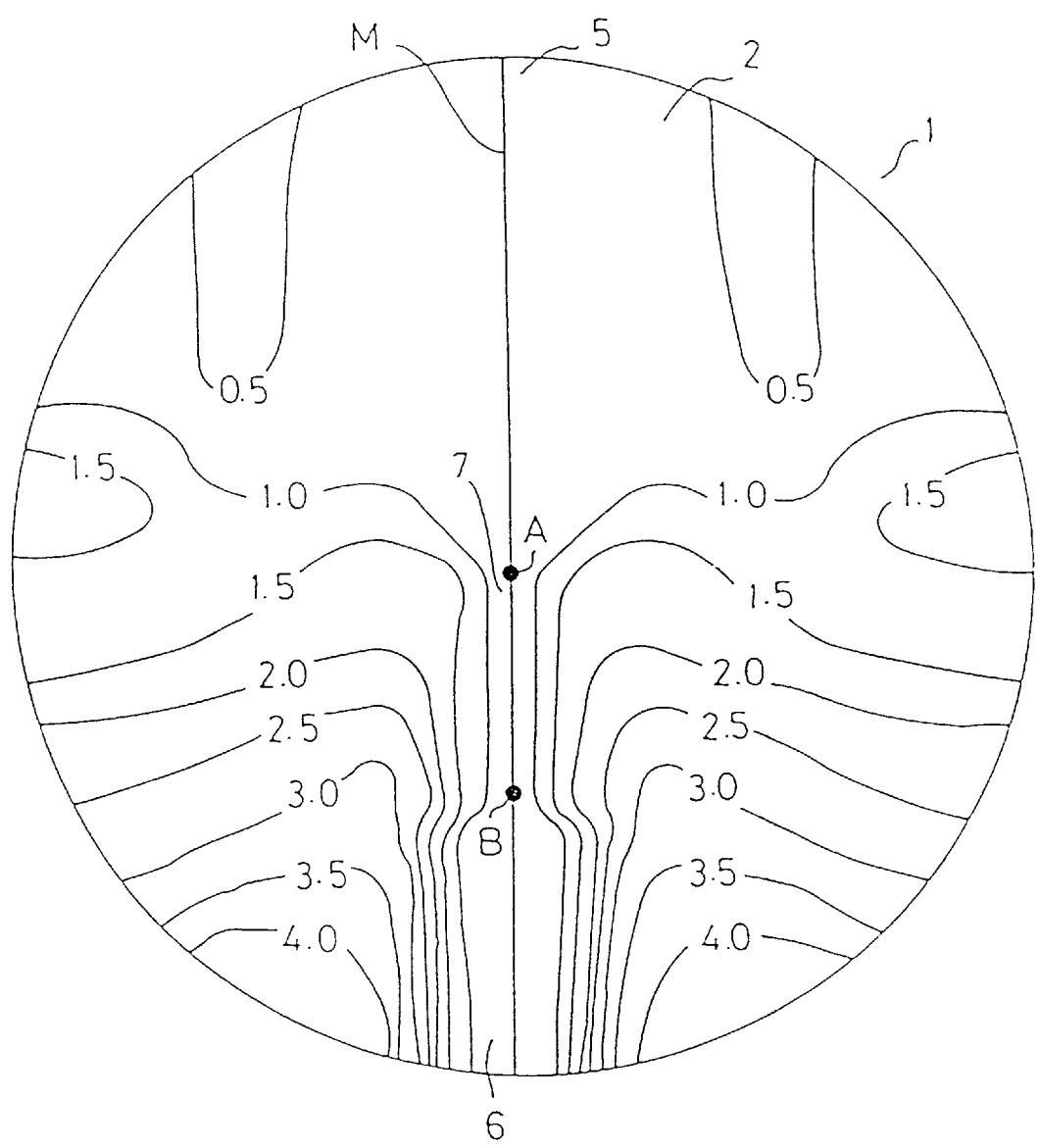
FIG. 20 shows astigmatisms of a progressive multifocal lens manufactured by a method according to the seventh embodiment of the present invention.

FIGS. 19 and 20 show astigmatism curves of progressive multifocal lenses, the basic specification of which is such that the base curve is 4.5 D, addition power is 3 D and the refractive power is 1.5. FIG. 19 shows the astigmatism curves of the lens manufactured by using a conventional higher polynomial. FIG. 20 shows the astigmatism curves of the surface of a lens manufactured by the method according to the present invention in such a manner that the surface of the lens is divided into 2 mm×2 mm lattice sections to obtain the curved-surface equation.

The progressive multifocal lenses according to this embodiment are lenses manufactured in accordance with the same design concept as that of the fifth embodiment. However, the lens shown in FIG. 19 and manufactured by the conventional method has great irregular portions in the astigmatism curves in the vicinity of the distance design reference point A and the near design reference point B. Thus, it can be understood that a lens having a satisfactory performance cannot be obtained. On the other hand, the lens shown in FIG. 20 and manufactured by the present invention has smooth astigmatism curves near the distance design reference point A and the near design reference point B without an irregular portion. Similarly, smooth astigmatism curves are obtained in the distance portion to the intermediate portion, the astigmatism curves being located at relatively long intervals. Therefore, even if a progressive multifocal lens has a large addition power, the present invention enables a lens having a satisfactory performance to be provided.

As described above, according to the present invention, the surface of the lens is divided into a plurality of sections to obtain the curved-surface equation for each of the sections. Thus, an optimum progressive multifocal lens having astigmatisms and refractive powers which are distributed in accordance with any of a variety of design concepts can be provided. Although the description of the exemplary embodiments has been about the progressive multifocal lens having a small near portion for use in eyeglasses for correcting presbyopia, the present invention is not limited to the progressive multifocal lens of the foregoing type. The present invention is able to provide a progressive multifocal lens which reflects the design concept having satisfactory performance even if the lens is a progressive multifocal lens having a small distance portion or another progressive multifocal lens in accordance with another design concept.

The method according to the present invention enables partial correction of the surface shape of the lens to be easily performed so that an optimum surface shape of a lens is obtained in a short period of time. In the foregoing examples, the ray tracing method is used when a progressive multifocal lens is manufactured while considering the refraction of each of the two surfaces of the lens. Therefore, the manufactured progressive multifocal lens according to the present invention has an improved surface astigmatism. Moreover, the performance as the lens adaptable to the eye of a wearer can be improved significantly. Although the foregoing embodiments have described a lens having satisfactory performance can be obtained in accordance with the astigmatism indicating the surface astigmatism, it is apparent that the present invention is able to provide a progressive multifocal lens having more improved performance as the performance when used with the eyes.

Although each of the examples have been described with respect to one surface, which is one of the two surfaces of the progressive multifocal lens and is divided into sections to manufacture the lens. Another surface, that is, the reverse surface, may, of course be divided into a plurality of sections to form the surface of a lens having the refractive power which is progressively changed. Moreover, the two surfaces of the lens may be manufactured by the method according to the present invention to further improve the performance of the lens.

As described above, according to the present invention, a progressive multifocal lens can be obtained which has a large clear field of vision and smooth astigmatism curves and which is capable of obtaining both clear static sight and dynamic sight.

[Industrial Applicability]

The present invention relates to the progressive multifocal lens and the manufacturing method therefor. A progressive multifocal lens for use as lenses for eyeglasses exhibiting a large clear field of vision and smooth astigmatism curves can be provided. Thus, eyeglasses enabling a wearer of the eyeglasses to obtain clear static sight and dynamic sight can be realized.

What is claimed is:

1. A progressive multifocal lens, comprising:

a distance portion having relatively low refractive power, a near portion having relatively high refractive power and an intermediate portion having refractive power which is progressively changed between said two portions, wherein at least either surface of said progressive multifocal lens is divided into a series of continuous small sections each of which has a surface shape determined in accordance with a curved-surface equation designed for each section, and said curved-surface equations for said sections are, in each boundary of said sections, continuous to each other at least to the extent of derivative functions of second order of said curved-surface equations.

2. A progressive multifocal lens according to claim 1, wherein each of said sections is divided into a lattice shape having a plurality of imaginary criss-crossing lines, wherein respective ones of the criss-crossing lines form lattice points of intersection.

3. A progressive multifocal lens according to claim 2, wherein adjacent ones of said lattice points of intersection are separated from one another at a distance in a range of about 1 mm to about 4 mm.

4. A progressive multifocal lens according to claim 2, wherein adjacent ones of said lattice points of intersection are separated from one another at a distance in a range of about 1 mm to about 3 mm.

5. A progressive multifocal lens according to claim 2, wherein adjacent ones of said lattice points of intersection are separated from one another at a distance in a range of about 1 mm to about 2 mm.

6. A progressive multifocal lens according to claim 3, wherein, in at least said near portion, adjacent ones of said lattice points of intersection are separated from one another at a distance in a range of about 1 mm to about 3 mm.

7. A progressive multifocal lens according to claim 3, wherein, in at least said intermediate portion, adjacent ones of said lattice points of intersection are separated from one another at a distance of about 1 mm.

8. A progressive multifocal lens according to claim 1, wherein said curved-surface equation is a bicubic expression.

9. A progressive multifocal lens according to claim 1, wherein said curved-surface equation for each section is determined in such a manner that a difference in distribution of astigmatisms and refractive powers at a position of a wearer's eye is minimized, said position obtained by a ray tracing method in accordance with a radius of curvature previously set to said section.

10. A method of manufacturing a progressive multifocal lens including a distance portion having relatively low refractive power, a near portion having relatively high refractive power and an intermediate portion having refractive power which is progressively changed between said two portions, said method of manufacturing the progressive multifocal lens comprising the steps of:

setting distribution of refractive power of said distance portion, said near portion and said intermediate portion for at least one surface of said progressive multifocal lens;

setting a radius of curvature in accordance with said set distribution of said refractive power;

dividing the surface of said lens into a series of continuous small sections;

determining a curved-surface equation for each section under a condition that at least said curved-surface equations for respective sections are continuous in the boundaries of the respective sections at least to the extent of derivative functions of second order of said curved-surface equations; and forming the surface of said lens to have a surface shape determined in accordance with said curved-surface equation for each section.

11. A method of manufacturing a progressive multifocal lens according to claim 10, wherein the surface of said lens is divided into lattice sections, each of said lattice sections having a plurality of imaginary criss-crossing lines whereby respective ones of the criss-crossing lines form lattice points of intersections.

12. A method of manufacturing a progressive multifocal lens according to claim 11, wherein adjacent ones of said lattice points of intersection are separated from one another at a distance in a range of about 1 mm to about 4 mm.

13. A method of manufacturing a progressive multifocal lens according to claim 11, wherein adjacent ones of said lattice points of intersection are separated from one another at a distance in a range of about 1 mm to about 3 mm.

14. A method of manufacturing a progressive multifocal lens according to claim 11, wherein adjacent ones of said lattice points of intersection are separated from one another at a distance in a range of 1 mm to about 2 mm.

15. A method of manufacturing a progressive multifocal lens according to claim 12, wherein, in at least said near portion, adjacent ones of said lattice points of intersection are separated from one another at a distance in a range of about 1 mm to about 3 mm.

16. A method of manufacturing a progressive multifocal lens according to claim 12, wherein, in at least said intermediate portion, adjacent ones of said lattice points of intersection are separated from one another at a distance of about 1 mm.

17. A method of manufacturing a progressive multifocal lens according to claim 10, wherein said curved-surface equation is a bicubic expression.

18. A method of manufacturing a progressive multifocal lens according to claim 10, further comprising a step, following said step of dividing the surface into the sections, of obtaining the difference in distribution of astigmatisms and in refractive powers for each section at the position of the wearer's eye obtained by a ray tracing method to correct the radius of curvature for each section in such a manner that the difference in the distribution of astigmatisms and in refractive powers are minimized.

* * * * *

UNITED STATES PATENT AND TRADEMARK OFFICE
CERTIFICATE OF CORRECTION

PATENT NO.  : 5,886,766
DATED       : March 23, 1999
INVENTOR(S) : Tadashi KAGA et al.

It is certified that error appears in the above-identified patent and that said Letters Patent is hereby corrected as shown below:

On the cover page, line [22], change "Filed: Jun. 6, 1996" to
   --PCT Filed: Sep. 26, 1995--

After line [22], insert --[86] PCT No.: PCT/JP95/01940
                                §371 Date: Jun. 6, 1996
                                §102(e) Date: Jun. 6, 1996--

After line [86], insert --[87] PCT Pub. No.: WO 96/11421
                                PCT Pub. Date: Sep. 26, 1995--

Signed and Sealed this

Twenty-fourth Day of August, 1999

Attest:

Q. TODD DICKINSON

*Attesting Officer*          *Acting Commissioner of Patents and Trademarks*